United States Patent [19]

Yamada et al.

[11] Patent Number: 5,734,749
[45] Date of Patent: Mar. 31, 1998

[54] CHARACTER STRING INPUT SYSTEM FOR COMPLETING AN INPUT CHARACTER STRING WITH AN INCOMPLETE INPUT INDICATIVE SIGN

[75] Inventors: Hiroshi Yamada; Toshikazu Fukushima; Kazunori Muraki, all of Tokyo, Japan

[73] Assignee: NEC Corporation, Tokyo, Japan

[21] Appl. No.: 364,290

[22] Filed: Dec. 27, 1994

[30] Foreign Application Priority Data

Dec. 27, 1993 [JP] Japan ................................ 5-330347
Dec. 27, 1993 [JP] Japan ................................ 5-331287

[51] Int. Cl.$^6$ ................................................ G06K 9/00
[52] U.S. Cl. ........................ 382/187; 382/229; 395/796
[58] Field of Search .................................. 382/186, 187, 382/189, 229, 230; 364/419.15; 395/144, 149, 155, 161, 326, 768, 796

[56] References Cited

U.S. PATENT DOCUMENTS

| | | | |
|---|---|---|---|
| 4,438,505 | 3/1984 | Yanagiuchi et al. | 364/900 |
| 4,559,598 | 12/1985 | Goldwasser et al. | 364/419 |
| 5,067,165 | 11/1991 | Nishida | 382/19 |
| 5,220,649 | 6/1993 | Forcier | 395/148 |
| 5,479,536 | 12/1995 | Comerford | 382/230 |
| 5,544,260 | 8/1996 | Chefalas et al. | 382/187 |

FOREIGN PATENT DOCUMENTS

| | | | |
|---|---|---|---|
| 55-59578 | 5/1980 | Japan | G06F 15/38 |
| 58-155443 | 9/1983 | Japan | G06F 3/02 |
| 59-208639 | 11/1984 | Japan | G06F 3/02 |
| 61-11891 | 1/1986 | Japan | G06K 9/66 |
| 2-16671 | 1/1990 | Japan | G06F 15/20 |
| 2-177726 | 7/1990 | Japan | H03M 11/04 |
| 3-166678 | 7/1991 | Japan | 382/187 |

*Primary Examiner*—Andrew Johns
*Attorney, Agent, or Firm*—Foley & Lardner

[57] ABSTRACT

A character string input system includes an input storage portion for temporarily storing input character string with an incomplete input indicative signs. There is also a word dictionary storing words. An incomplete word supplementing portion compares the character string with the word stored in the word dictionary. Also, there is a neglected word supplementing portion for predicting a word to be supplemented at the position of the incomplete input indicative sign representing an omitted word. A supplementing candidature storage portion temporarily stores candidate character strings for the incomplete word supplementing portion and the neglected word supplementing portion. A supplementing control portion controls the incomplete word supplementing portion and the neglected word supplementing portion on the basis of the incomplete input indicative sign, and retrieves the candidate character string corresponding to the position of the incomplete input indicative sign in the character string.

10 Claims, 24 Drawing Sheets

FIG.7
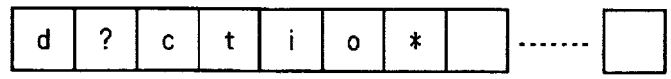
FIG.8
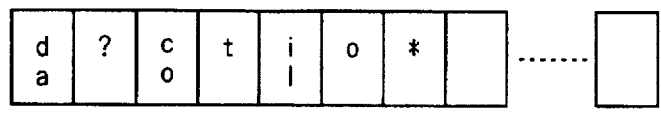
FIG.9
| I— to the school. |
|---|
FIG.10
| first expression | second expression |
|---|---|
| DICTIONARY<br>SCHOOL<br>⋮ | dictionary<br>school<br>⋮ |
FIG.11
| first expression | second expression |
|---|---|
| SCHOOL<br>SCHOOl<br>SCHOoL<br>SCHoOL<br>SChOOL<br>⋮<br>SChool<br>⋮<br>school<br>⋮ | school<br>school<br>school<br>school<br>school<br>⋮<br>school<br>⋮<br>school<br>⋮ |

FIG.12

| first expression | second expression |
|---|---|
| dictionary<br>school<br>⋮ | dictionary<br>school<br>⋮ |

FIG.13

```
diction
dictionary
dictionaries
       ⋮
```

FIG.14

```
go
get
```

— 1 —

CHARACTER STRING INPUT SYSTEM FOR COMPLETING AN INPUT CHARACTER STRING WITH AN INCOMPLETE INPUT INDICATIVE SIGN

BACKGROUND OF THE INVENTION

1. Field of the Invention

The present invention relates generally to a character string input system for inputting a character string to electronic devices, such as a personal computer, wordprocessor and so forth. More specifically, the invention relates to a character string input system for inputting a character string for handwritten characters utilizing a character recognition technology.

2. Description of the Related Art

As one example of methods for inputting a character string to electronic devices or equipment, such as a personal computer, a wordprocessor and so forth, there is a method of inputting a character as an image data by means of a tablet, a touch panel, a mouse and so forth and then converting the input character image into a character code by character recognition. Such an input method utilizing character recognition is convenient particularly for those who are not proficient in keyboard input, since it does not require special skill in typing. Also, since down-sizing of such type of an input device is relatively easy, it is suitable for an application for a hand-held type terminal device so forth. On the other hand, the input method employing character recognition has a drawback of low input speed. Furthermore, when the handwritten character cannot be recognized accurately which makes it impossible to determine the input character in straightforward manner, the operator should select the correct character from a plurality of nominated possible characters. Such operation is cumbersome and further slows down the input speed.

On the other hand, in inputting the character strings by means of a keyboard, there is a substantial work load for inputting a long document, or a long word, and the typing may possibly contain typographical errors.

Therefore, in the prior art, there are various means for compensating for such defects which have been employed.

For instance, Japanese Examined Patent Publication (Kokoku) No. Showa 63-49264, entitled "Character Recognition and Kana-Kanji Conversion System" has been disclosed. "Kana" represents a Japanese character normally called "Hiragana", and "Kanji" represents a Chinese character. The disclosed system is directed for handwritten input of the Japanese characters, in which the "Kana" character is input and the input "Kana" character or characters is converted into the "Kanji" character. In general, the "Kana" character of Japanese characters is simpler than the "Kanji" characters in structure. Therefore, employing such "Kana-Kanji Conversion" may improve input efficiency.

On the other hand, Japanese Unexamined Patent Publication (Kokai) No. Showa 61-11891, entitled "Handwritten Character Pattern recognition System" discloses a technology for character string input of Japanese characters in "Kanji" character expression. In particular, the disclosed system preliminarily registers complicated "Kanji" characters and frequently used "Kanji" characters as corresponding to the handwritten pattern used for inputting the registered characters. In Japanese Unexamined Patent Publication No. Showa 59-208639, entitled "Document Drafting System" and Japanese Unexamined Patent Publication No. Heisei 2-177726, entitled "Kanji Input System", there are disclosed technologies for inputting a "Bushu" which is a meaningful fraction of "Kanji" character separated according to predetermined rule, as a pattern easy to be input and then inputting the "Kanji" having the input "Bushu".

Also, Japanese Unexamined Patent Publication No. 2-16671, entitled "Document Drafting Aiding System" discloses a system, in which a correspondence table defining an abbreviated form character string for a predetermined character string is provided for retrieving the character string corresponding to the input incomplete form character string from the correspondence table in order to convert it into the desired character string. As similar technology, Japanese Unexamined Patent Publication No. Showa 58-155443, entitled "Japanese Language Input System" discloses a technology for inputting a front part of a word and an incomplete input indicative sign to display words having front parts matching therewith in order to permit the user to select the desired word.

However, the foregoing conventional document input means requires the system to preliminarily register the words and an incomplete form thereof, which makes preparation cumbersome. Also, incomplete input is permitted to use only the given number of leading characters.

Also, in all of the foregoing systems, it is required to input at least a part of the "Kanji" character or the reading thereof. Therefore, satisfactory shortening of input period cannot be expected.

SUMMARY OF THE INVENTION

Therefore, it is a first object of the present invention to provide a character string input system which permits incomplete input of a target character string in a handwriting character string input means, for shortening a period required for inputting and for reducing work load on a user inputting a character string.

A second object of the present invention is to provide a character string input system which permits incomplete input of a target character string and permits input of a phrase including a character which is difficult for user to handwrite, by omitting to input the difficult character.

A third object of the present invention is to provide a character string input system which permits incomplete input of a target character string in a handwriting character string and which avoids influence of a precision of a character recognition for the part omitted.

A fourth object of the present invention is to provide a character string input device which permits incomplete input of a target character string in a handwriting character string and thus avoids erroneous characters which otherwise would be contained due to an erroneous memory of one or more characters for the part supplemented by the interpolation or extrapolation.

According to the first aspect of the invention, a character string input system includes an input storage means for temporarily storing an input character string with an incomplete input indicative sign. There is provided a word dictionary storing words. Also, there is an incomplete word supplementing means comparing the character string with the incomplete input indicative sign and the word dictionary. There is a neglected word supplementing means for predicting a word to be supplemented at the position of the incomplete input indicative sign representative of an omitted word. A supplementing candidature storage means is for temporarily storing a candidate character string for the incomplete word supplementing means and the neglected word supplementing means. A supplementing control means is for controlling the incomplete word supplementing means and the neglected word supplementing means on the basis of the kind of the incomplete input indicative sign for retrieving the candidate character string corresponding to the position of the incomplete input indicative sign in the character string with the incomplete input indicative sign.

According to a second aspect of the invention, a character string input system includes a character string input means for inputting a character string. An incomplete input indicative sign input means is for inputting an incomplete input indicative sign indicative of neglecting of a word. There is an input storage means for temporarily storing an input character string with an incomplete input indicative sign input by the character string input means and incomplete input indicative sign input means.

There is provided a word dictionary storing words.

Also provided is an incomplete word supplementing means for comparing the character string with the incomplete input indicative sign and the word dictionary with taking the incomplete input indicative sign representative of neglecting of a part of word as wild card. An example storage means is for storing example of words. There is a neglected word supplementing means for predicting a word to be supplemented at the position of the incomplete input indicative sign representative of the omitted word on the basis of the examples of the words. A supplementing candidature storage means is for temporarily storing a candidate character string for the incomplete word supplementing means and the neglected word supplementing means. A selection command input means is for inputting command for selection of the supplementing candidature.

There is a supplementing control means for controlling the incomplete word supplementing means and the neglected word supplementing means on the basis of the kind of the incomplete input indicative sign for retrieving the candidate character string corresponding to the position of the incomplete input indicative sign in the character string with the incomplete input indicative sign, and when a plurality of candidates is present, controlling the selection command input means for determining the character string.

According to a third aspect of the invention, a character string input system includes a character string input means for inputting a character string. There is also an incomplete input indicative sign input means for inputting an incomplete input indicative sign indicative of an omitted word. An input storage means is for temporarily storing an input character string with an incomplete input indicative sign input by the character string input means and incomplete input indicative sign input means.

Also provided is a word dictionary storing words; and an incomplete word supplementing means for comparing the character string with the incomplete input indicative sign and the word dictionary with taking the incomplete input indicative sign representative of neglecting of a part of word as wild card.

There is also an example storage means for storing example of words. A neglected word supplementing means is for predicting a word to be supplemented at the position of the incomplete input indicative sign representative of the omitted word on the basis of the examples of the words.

A supplementing candidature storage means is for temporarily storing candidate character string for the incomplete word supplementing means and the neglected word supplementing means. There is a selection command input means for inputting command for selection of the supplementing candidature.

Also, there is a supplementing control means for controlling the incomplete word supplementing means and the neglected word supplementing means on the basis of the kind of the incomplete input indicative sign in the input storage means and the command input by the selection command input means for determining a character string corresponding to the position of the incomplete input indicative sign in the character string with the incomplete input indicative sign.

In the preferred embodiment, the supplementing control means controls the incomplete word supplementing means on the basis of the kind of the incomplete input indicative sign in the input storage means. When the supplementing candidature is not obtained or when triggering of the neglected word supplementing means is commanded by the selection command input means, it also controls the neglected word supplementing means for determined the character string corresponding to the position of the incomplete input indicative sign in the character string with the incomplete input indicative sign.

According to a fourth aspect of the invention, a character string input system includes a direct character string storage means for storing character coded input character string; and a character string predicting means for generating a candidate character string directly following the character string in the direct character sting storage means. There is a predicted character string storage means for storing the candidate character string generated by the character string predicting means; and a display means and display control means for constructing content of a display information storage means on the basis of the content of the direct character string storage means, the content of the predicted character string storage means and a command from a selection command input means and display the constructed content.

According to a fifth aspect of the invention, a character string input system includes a character recognizing means for performing character recognition for a handwritten trace data of a character and deriving a character code corresponding to the handwritten trace data. There is a direct character string storage means for storing the character string character coded by the character recognizing means.

Also provided is a character string predicting means for generating a candidate character string directly following the character string in the direct character string storage means; and a predicted character string storage means for storing the candidate character string generated by the character string predicting means. Further, there is included a display means and display control means for constructing content of a display information storage means on the basis of the content of the direct character string storage means, the content of the predicted character string storage means and a command from a selection command input means and display the constructed content.

According to a sixth aspect of the invention, a character string input system includes a character handwriting means for obtaining handwritten character trace data; and handwritten character storage means for storing the trace data. There is a selection command input means for inputting a command for selection and verification. Also provided is a character recognizing means for performing character recognition for deriving a character code; and a direct character string storage means for storing the character string character coded by the character recognizing means.

A character string predicting means is for generating candidate character sting directly following the character string in the direct character string storage means. A predicted character string storage means is for storing the candidate character string generated by the character string predicting means. Also provided are a display means for displaying the character string, the display means having an input character string region and a predicted character string region; a display information storage portion for storing information to be displayed on the display means; and a display control means for constructing the content of the display information storage means on the basis of the content of the handwritten character storage means, the content of the direct character string storage means, the content of the predicted character string storage means and a command from the selection command input means and display the constructed content.

In the preferred construction, the display control means temporarily displays the trace data in the handwritten character storage means on the input character region. It also updates the display in the input character region with a character string corresponding to the direct character string storage means in place of the trace data when character recognition for the trace data by the character recognizing means is completed. It further displays a candidate character string from the predicted character string storage means in the predicted character string region; and controls the content of the display of the display means so as to display the selected one candidate character string in the predicted character string storage means following the character string in the input character string region when a command selecting character string in the predicted character string region is input from the selection command input means.

According to a seventh aspect of the invention, a character string input system includes a character handwriting means for obtaining handwritten character trace data; a handwritten character storage means for storing the trace data; a character recognizing means for performing character recognition for deriving a character code; and a direct character string storage means for storing the character string character coded by the character recognizing means. In addition, there is a character string predicting means for generating a candidate character string directly following the character string in the direct character string storage means. There is a predicted character string storage means for storing the candidate character string generated by the character string predicting means; and a display means for displaying a predicted character string region immediately following an input character string region. A display information storage portion is for storing information to be displayed on the display means. An overwriting detecting means detects overwriting of the handwritten character on the predicted character region. A display control means constructs the content of the display information storage means on the basis of the content of the handwritten character storage means, the content of the direct character string storage means, the content of the predicted character string storage means and an overwriting detection signal from the overwriting detecting means, and controlling the content of display of the display means.

In the preferred construction, the display control means temporarily displays the trace data in the handwritten character storage means on the input character region. Further, it updates the display in the input character region with a character string corresponding to the direct character string storage means in place of the trace data when character recognition for the trace data by the character recognizing means is completed. It also displays one character string in the predicted character string storage means in the predicted character string region; and, when the overwriting detection signal is received from the overwriting detecting means, it fixes the character in the predicted character string up to one immediately preceding the overwriting character as the input character string and erases the characters in the predetermined character string at and subsequent to the overwritten character.

According to an eighth aspect of the invention, a character string input system includes a character input means for obtaining handwritten character trace data; and an input character storage means for storing the trace data. It further includes a selection command input means for inputting command for selection and verification; and a character recognizing means for performing character recognition for deriving a character code.

There is also a direct character string storage means for storing the character string character coded by the character recognizing means. A character string predicting means generates a candidate character string directly following the character string in the direct character string storage means. A predicted character string storage means stores the candidate character string generated by the character string predicting means. A display means displays a predicted character string region immediately following an input character string region. A display information storage portion stores information to be displayed on the display means. Also provided is an overwriting detecting means for detecting overwriting of the handwritten character on the predicted character region. There is a display control means for constructing content of the display information storage means on the basis of the content of the handwritten character storage means, the content of the direct character string storage means, the content of the predicted character string storage means, an overwriting detection signal from the overwriting detecting means and the command from the selection command input means, and controlling the content of display of the display means.

In the preferred construction, the display control means temporarily displays the trace data in the handwritten character storage means on the input character region; and updates the display in the input character region with a character string corresponding to the direct character string storage means in place of the trace data when character recognition for the trace data by the character recognizing means is completed. It also displays one character string in the predicted character string storage means in the predicted character string region; and displays another candidate character string stored in the predicted character string storage means in the predicted character string region in response to the selection command from the selection command input means. When the overwriting detection signal is received from the overwriting detecting means, it fixes the character in the predicted character string up to one immediately preceding the overwriting character as the input character string and erases the characters in the predetermined character string at and subsequent to the overwritten character.

BRIEF DESCRIPTION OF THE DRAWINGS

The present invention will be understood more fully from the detailed description given below and from the accompanying drawings of the preferred embodiment of the invention, which, however, should not be taken to be limitative to the present invention, but are for explanation and understanding only.

In the drawings:

FIGS. 7 to 9 are illustrations showing examples of storage content in an input buffer;

FIGS. 10 to 14 are illustrations showing examples of an association between various expressions of input character strings and results of character recognition;

DETAILED DESCRIPTION OF THE PREFERRED EMBODIMENTS

The present invention will be discussed in detail in terms of the preferred embodiment with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to avoid unnecessarily obscuring the present invention.

Figure 1:
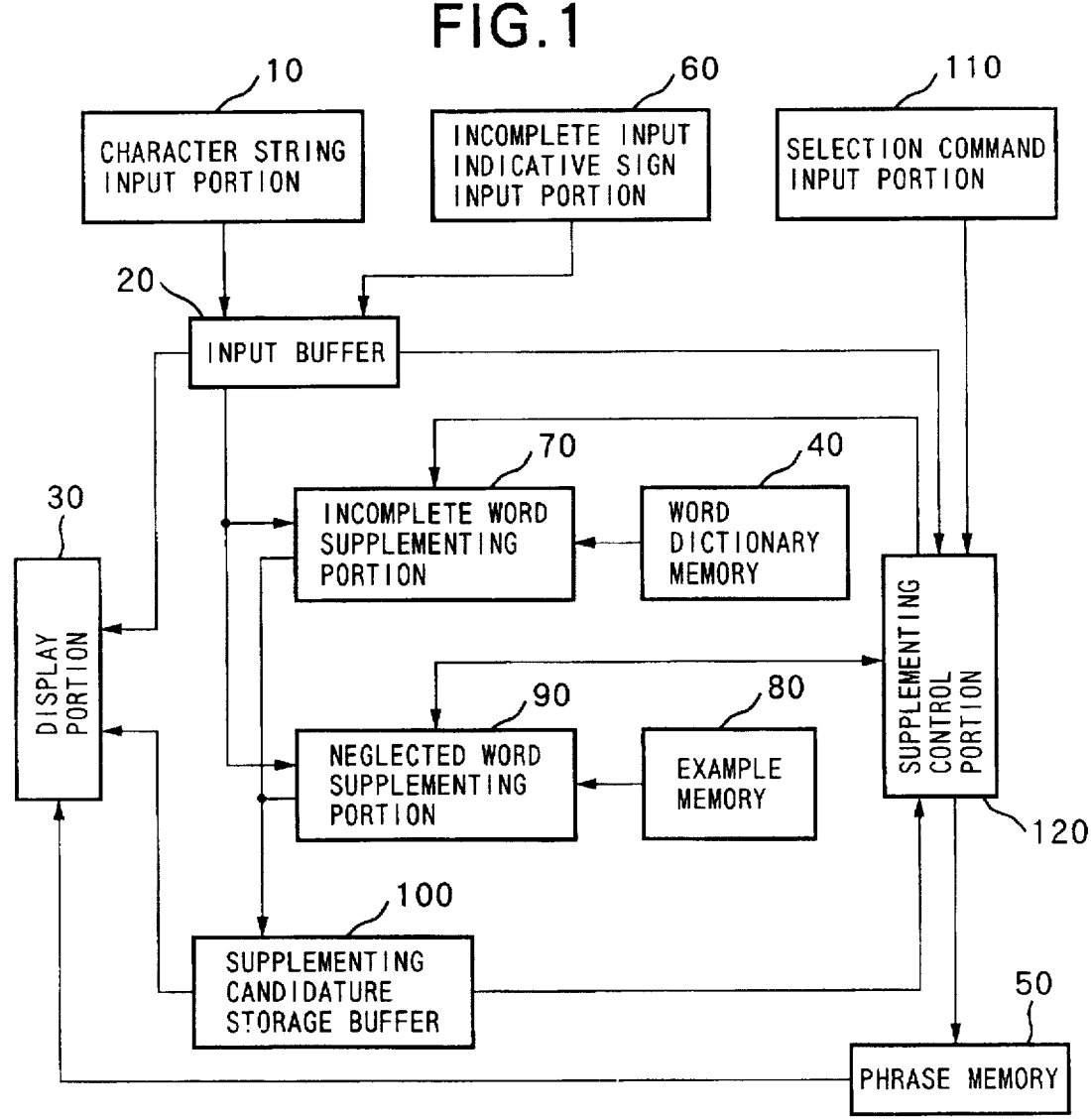
FIG. 1 is a block diagram showing a first embodiment of a microcomputer system according to the present invention.

FIG. 1 is a block diagram showing the first embodiment of a character string input system according to the present invention.

As shown in FIG. 1, the illustrated embodiment of a character string input system comprises a character string input portion 10 for inputting a character string, an input buffer 20 for temporarily storing the input character string, a display portion 30 for displaying an input character string and a generated phrase, a word dictionary memory 40 storing data relating to expression of the words, a phrase memory 50 for storing a generated phrase, an incomplete input indicative sign input portion 60 for inputting an incomplete input indicative sign indicative of a presence of an incomplete word in the input character string, a neglected word supplementing portion 70 and an incomplete word supplementing portion 90 for supplementing omitted or incomplete words, an example memory 80 for storing examples of grammar and words, a supplementing candidature buffer 100 for storing supplementing candidature for supplementing omitted or incomplete words, a selection command input portion 110 for selecting an appropriate candidature among nominated candidatures, and a supplementary control portion 120 for controlling operation of the neglected word supplementing portion and incomplete word supplementing portion.

Figure 2:
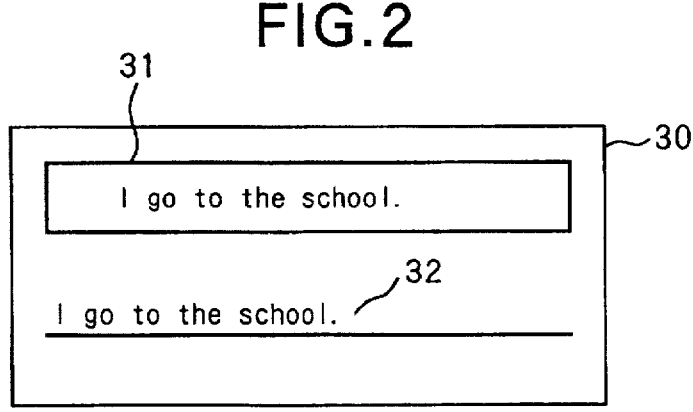
FIG. 2 is an illustration showing an example of a display of an input handwritten character string and a result of character recognition.

The character string input portion 10 is a means for inputting a character as a character code. In the shown embodiment, the character string input portion 10 can be realized with an input device for inputting a coordinate position, such as an input tablet, a pen, a mouse, a touch panel and so forth (herein after referred to as "pointing device") and a character recognizing means, in combination. It is naturally possible to realize the character string input portion 10 by a keyboard. When the character string input portion 10 is realized by the combination of the pointing device and the character recognition means, it is possible that a plurality of characters or character strings as candidatures similar in configurations with respect to the input character string depending upon the precision of character recognition. When a plurality of candidatures are nominated, it is possible to reduce the number of candidatures by comparing the combination of the leading and trailing characters with reference to a word dictionary. FIG. 2 is an illustration showing an example of a display of an input handwritten character string and a result of character recognition. The reference numeral 31 denotes a region to input characters, 32 denotes a region to display the result of recognition. In FIG. 2, there is shown an example for the case where a phrase "I go to the school" is input.

The incomplete input indicative sign input portion 60 is a means for inputting an incomplete input indicative sign indicative of incompletion of the word.

The incomplete input indicative sign input portion 60 may be realized by an input device, such as a pointing device, keyboard and so forth. The incomplete input indicative sign input portion 60 may also be realized by utilizing the same device to the character string input portion 10. As the incomplete input indicative sign, a specific pattern or character input, a specific key input, a specific region designation, a character interval and so forth may be used. Kinds of the incomplete input indicative sign, in addition to the incomplete input indicative sign indicative of the partial omission of the word, omission of the word and so forth, distinction by number of characters omitted, kind (capital or small letter) of the omitted characters and so forth may be provided for further division.

FIGS. 3 to 6 are explanatory illustrations showing a manner of inputting of a word "dictionary" and a phrase "I go to the school". Each figure shows the input screen to be displayed on the display portion 30 upon inputting of the character string by the character input portion 10.

Figure 3:
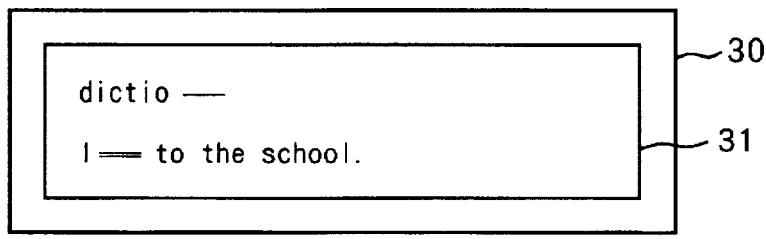
FIGS. 3 to 5 are explanatory illustrations showing a manner of inputting of a word "dictionary" and a phrase "I go to the school"

FIG. 3 shows an example, in which a hyphen "-" is used as the incomplete input indicative sign. In FIG. 3, the word "dictionary" and the phrase "I go to the school" are respectively input in incomplete form, such as "dictio - - - " and "I=to the school". In the illustrated embodiment, a single line "-" represents omission of a part of word, and a double line "=" represents omisison of a part of phrase. It is further possible to provide further distinction for the omission by number of characters, kind of characters and so forth.

Figure 4:
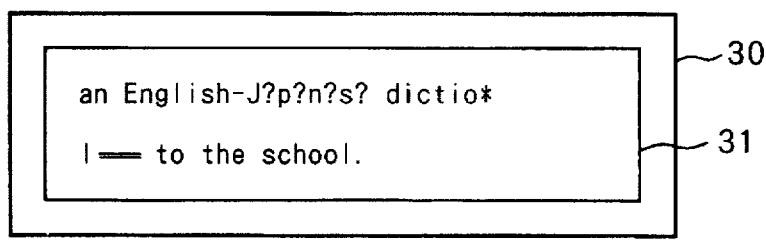

FIG. 4 shows an example, in which an incomplete input indicative sign for omitting one character and an incomplete input indicative sign for omitting more than one characters are differentiated. Namely, in the example of FIG. 4, the incomplete input indicative sign "?" is used for omission of one character and the incomplete input indicative sign is used for omission of more than one character. Similarly to the example of FIG. 3, the incomplete input indicative sign of double line "=" represents omission of a word.

Figure 5:
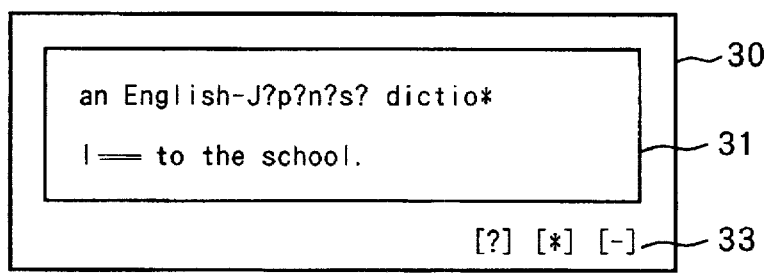

FIG. 5 shows an example in which a specific region for inputting the incomplete input indicative sign is provided on the input screen. In this example, by designating one of the signs "?", "*" and "=" in a region 33 located at the lower side of the character input region 31, the incomplete input indicative sign similar to those in the example of FIG. 4 can be input. In this example, the designated incomplete input indicative sign is displayed on the character input region 31. It is also possible to perform input of the incomplete input indicative signal through a separate device, such as depression of the keyboard without providing the specific region for inputting the incomplete input indicative sign on the screen.

Figure 6:
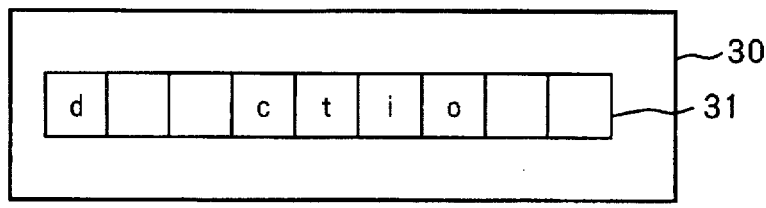
FIG. 6 illustrates a space or interval used as an incomplete input indicative sign.

FIG. 6 shows an example where a space or interval of the input characters is used as the incomplete input indicative sign. In this example, a distance between the characters greater than or equal to a given distance (for example, the distance for two characters as shown) may be taken as the incomplete input indicative sign. While the illustrated example shows grids for inputting characters, the incomplete input indicative sign may be identified by the width of spacing between the characters even when the grid is not provided. Also, by varying the width of the spacing between the characters, different incomplete input indicative signs, such "*", and *?" as and so forth can be distinguished.

The input buffer 20 stores the character string input through the character input portion 10 and the incomplete input indicative sign input through the incomplete input indicative sign input portion 60 as a character string with the incomplete input indicative sign. The input buffer 20 may be realized by a memory device, such as a semiconductor memory.

FIGS. 7 to 9 are illustrations showing examples of storage content in the input buffer 20. In these drawings, "*" and "?⇔ represent internal codes corresponding to the incomplete input indicative signs. FIG. 7 shows a character string with the incomplete input indicative sign in the case where the word "dictionary" is input with utilizing an incomplete input indicative sign indicative of omission of a part of the word. FIG. 8 shows a character string with the incomplete input indicative sign in the case where, upon inputting of the character string, accurate character recognition cannot be performed in order to present a plurality of candidatures. Namely, "d" and "a", "c and o", and "i" and "l" are respectively nominated as candidatures. FIG. 9 shows an example of the character string with the incomplete input indicative sign when one word is omitted upon inputting the phase of "I go to the school".

The word dictionary memory 40 registers and establishes an association for each expression of the word when a plurality of expressions are used for each word. The word dictionary memory 40 may be formed by a memory device, such as a semiconductor memory. In the alternative, the word dictionary memory 40 may comprise a file device, such as a hard disk drive. In the word dictionary memory 40, an expression with capital letters is registered as a first expression and an expression with small letters is registered as a second expression (see FIG. 10), for example. Alternatively, by registering an expression with a mixture of capital and small letter as the first expression and with only capital letters as the second expression, the input of the mixture of capital and small letters may be converted into the word in capital letters (see FIG. 11). When an input character is restricted to one expression, such as capital letters, expressions with capital letters may be registered for both first and second expressions.

The phrase memory 50 is means for storing the phrase or document resulting from supplementing of the omitted or incomplete portion. This phrase memory 50 may be realized by a semiconductor memory, or, in the alternative, by a file device, such as a hard disk drive.

The display portion 30 displays the generated phrases, input characters, the incomplete input indicative sign, candidatures for completion and so forth. This may be realized by a CRT display, a liquid crystal display and so forth. Also, the display portion 30 may be realized by an integrated liquid crystal display, in which an input tablet and the liquid crystal display are integrated.

The neglected word supplementing portion 70 retrieves the first expression consistent with the character string with the incomplete input indicative sign stored in the input buffer 20 and stores the corresponding second expression in the supplementing candidature buffer 100. Upon performing retrieval, and if there are candidatures for character, it is sufficient to match any one of the candidate characters. The incomplete input indicative sign indicative of omission of a part of the word is regarded to be consistent with an arbitrary character or a character string. For instance, with respect to the character string with the incomplete input indicative sign of "d?ctio*", the words "diction" and "dictionary" may be listed as candidatures.

When there are too may words matching with the input character strings having the incomplete input indicative sign to store in the supplementing candidature buffer 100 and to display, a given number of the candidatures may be stored according to the order of retrieval. Alternatively, it may also be possible to provide a preference for respective candidatures according to the length of the word or frequency of use to store only candidatures having a higher preferential order. Furthermore, it should be possible to generate only an alarm to display and not to store any candidature of a character or a character string. On the other hand, it is possible not to perform retrieval when the character string with the incomplete input indicative sign consists of only an incomplete input indicative sign. Also, it is further possible to take a character string including the incomplete input indicative sign of the character string with the incomplete input indicative sign stored in the input buffer 20 and to make reference to the word dictionary memory 40. In such a case, candidatures may be obtained by a plurality of partial character strings. With respect to these, it is possible to take methods, such as store all, store only candidatures corresponding to the longest partial character string, or so forth. In the method to store the candidatures corresponding to the longest partial character string, with respect to the example of "d?ctio*", "do" corresponding to "d?" and "action" corresponding to "?ctio*" and so forth may be retrieved in addition to "diction" and "dictionary" corresponding to the longest partial character string "d?ctio*", only "diction" and "dictionary" corresponding to the longest partial character string "d?ctio*" are stored in the supplementing candidature buffer 100.

The example memory 80 stores examples of grammatical rules and words. The example memory 80 may be realized by a memory device, such as a semiconductor memory, or, in the alternative, a file device, such as a hard disk drive. In the example memory 80, for instance, the case of the verb, a set of words commonly occurring in relationship, set phrases, and composite words are stored in the example memory 80.

The incomplete word supplementing portion 90 makes reference to the example memory 80 to predict the word at the incomplete input indicative sign of the word input to the incomplete input indicative sign input portion 60 and stores the predicted word in the supplementing candidature memory 100. When a quite large number of examples are matched with the character string with the incomplete input indicative sign and cannot be stored in the supplementing candidature buffer 100 or displayed, a given number of the candidatures may be stored according to the order of retrieval. Alternatively, it may also be possible to provide preference for respective candidatures according to the length of the word or frequency of use in order to store only candidatures having higher preferential orders. Furthermore, it should be possible to generate only alarms to display and not to store any candidature of a character or a character string. Upon making a judgment of a match between the examples and the character string with the incomplete input indicative sign, various methods, such as those matching partially or ignoring particle, infective variation or so forth.

The supplementing candidature buffer 100 stores candidatures of the word output from the omitted word supplementing portion 70 and the incomplete word supplementing portion 90. The supplementing candidature buffer 100 may be formed with a memory device, such as a semiconductor memory or a file device, such as a hard disk drive.

The selection command input portion 110 is accessible by the user to enter a command for selecting one of the candidatures stored in the supplementing candidature buffer 100. The selection command input portion 110 may be realized by the pointing device, the keyboard and so forth. The selection command input portion 110 may also be realized by the same device to the character string input portion 10 or the incomplete input indicative sign input portion 60.

The supplementing control portion 120 controls the neglected word supplementing portion 70 and the incomplete word supplementing portion 90 according to the content of the storage in the input buffer 20. When the character string stored in the input buffer 20 contains the incomplete input indicative sign indicative of omission of the word, the candidature of the word is stored in the supplementing candidature buffer 100 by the incomplete word supplementing portion 90. Then, the candidatures stored in the supplementing candidature buffer 100 are displayed on the display portion 30. Furthermore, according to the input from the selection command input portion 110, the incomplete input indicative sign is replaced with the character or the character string to store in the phrase memory 50.

Next, when the character string is input in incomplete form by utilizing the incomplete input indicative sign, the operation of the illustrated embodiment will be discussed with examples in the case where the word "dictionary" and "d?ctio*" as shown in FIG. 4 are input.

At first, the character string and the incomplete input indicative sign are input from the character string input portion 10 and the incomplete input indicative sign input portion 60 (see FIG. 4).

Next, the character string with the incomplete input indicative sign is stored in the input buffer 20. In the illustrated embodiment, when "(da)?(oo)t(il)o*" shown FIG. 8 is stored in the input buffer 20 (the portion indicated with parenthesis represents a plurality of candidatures as the results of character recognition).

Next, the supplementing control portion 120 triggers the neglected word supplementing portion 70 since the character string with the incomplete input indicative sign contains the incomplete input indicative sign indicating omission of a part of the word.

Next, the neglected word supplementing portion 70 makes reference to the word dictionary memory 40, retrieves words consisted of an arbitrary character string, such as "d" or "a" of the first character, an arbitrary character for the second character, etc" or "o" for the third character, "t" for the fourth character, "ill or "1" for the fifth character, "o" for the sixth character and arbitrary characters for seventh and subsequent characters. The result of retrieval is stored in the supplementing candidature buffer 100. The example of the retrieved word is shown in FIG. 13.

Next, the supplementing control portion 120 displays the content of the supplementing candidature buffer 100 on the display portion 30 and waits for the input from the selection command input portion 110.

Finally, the supplementing control portion 120 replaces the word "dictionary" for the character string with the incomplete input indicative sign and the character string "dictionary" as the result stores in the phrase memory 50.

It should be noted that when the partial character string of the character string with the incomplete input indicative sign is retrieved, retrieval for "(da)?" and "?(co)t(il)o*" is performed. However, when a method to store only candidatures corresponding to the longest partial character string is employed, the content to be stored the supplementing candidature buffer 100 is unchanged.

Next, the operation of the illustrated embodiment when the incomplete input indicative sign is indicative of the omission of the word, will be discussed with respect to the example of inputting "I=to the school" as shown in FIG. 4 for the phrase "I go to the school".

At first, from the character string input portion 10 and the incomplete input indicative sign input portion 60, the character string and the incomplete input indicative sign are input (see FIG. 4).

Next, the character string with the incomplete input indicative sign is stored in the input buffer 20. In the illustrated example, "I=to the school" shown in FIG. 9 is stored in the input buffer 20.

Next, the supplementing control portion 120 triggers the incomplete word supplementing portion 90 since the incomplete input indicative sign is included in the character string with the incomplete input indicative sign.

Next, the incomplete word supplementing portion 90 compares the example memory 80 and the character string with the incomplete input indicative sign in the input buffer 20. Then, an example is found, the portion corresponding to the incomplete input indicative sign in the example is stored in the supplementing candidature buffer 100. In the illustrated embodiment, the example shown in FIG. 14 is stored.

Then, the supplementing control portion displays the content of the supplementing candidature buffer 100 on the display portion and waits for input from the selection command input portion 110.

Finally, the supplementing control portion 120 replaces the incomplete input indicative sign with the word "go" according to input from the selection command input portion 110, and the resultant phrase "I go to the school" is stored in the phrase memory 50.

Supplementing not only noun, verb, it is possible to generate a phrase "I go to the school" for the character string by comparing the incomplete input indicative sign "I go= school" with the example memory 80.

Figure 15:
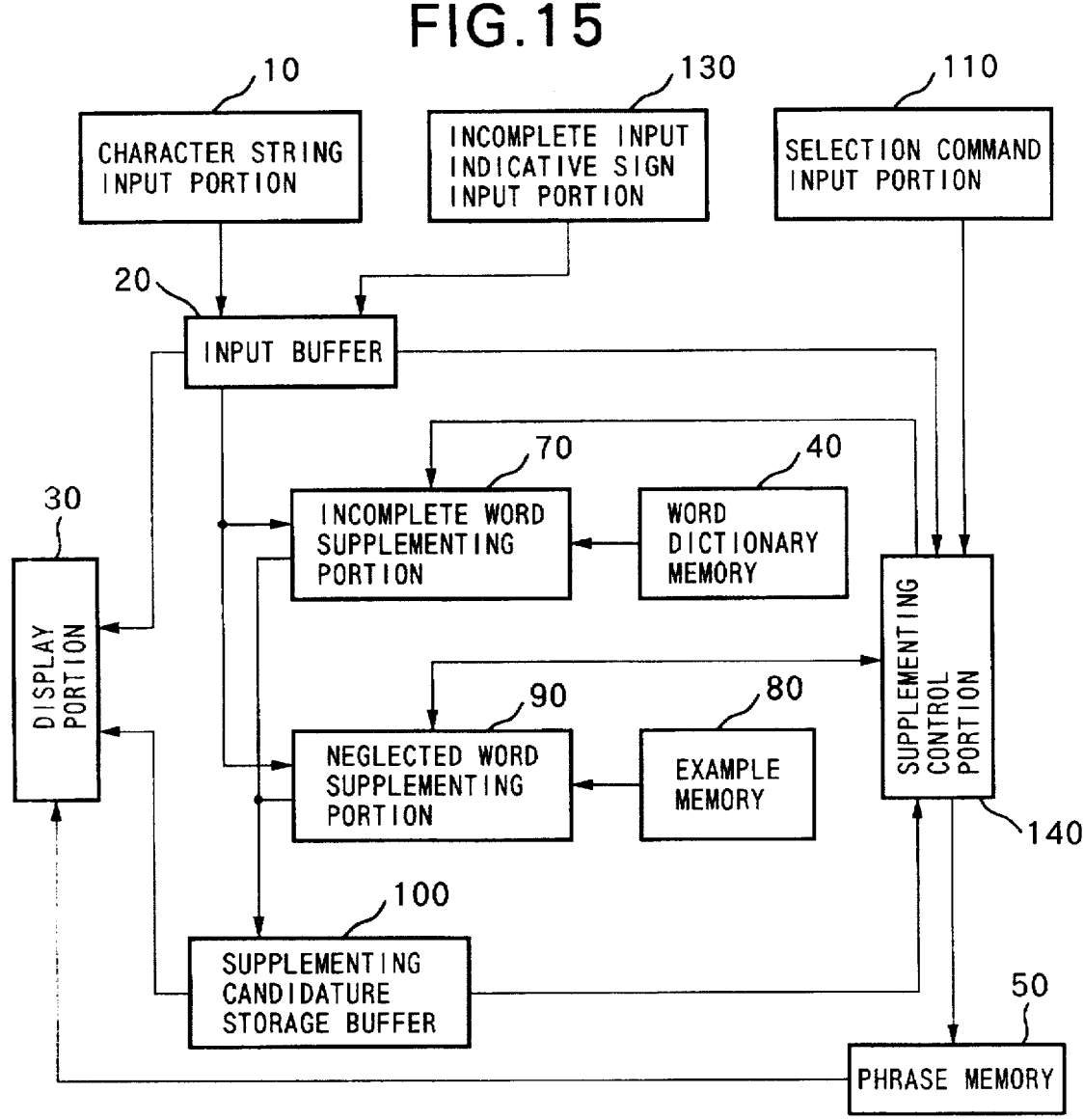
FIG. 15 is a block diagram showing the second embodiment of the character string input device according to the present invention.

FIG. 15 is a block diagram showing the second embodiment of the character string input device according to the present invention.

As shown in FIG. 15, the illustrated embodiment of the character string input system comprises a character string input portion 10 for inputting the character string, the input buffer 20 for temporarily storing the input character string, the display portion 30 for displaying the input character string and the generated phrase, the word dictionary memory 40 storing data relating to expression of the words, the phrase memory 50 for storing generated phrase, an incomplete input indicative sign input portion 130 for inputting an incomplete input indicative sign indicative of presence of an incomplete word in the input character string, the neglected word supplementing portion 70 and the incomplete word supplementing portion 90 for supplementing omitted or incomplete words, the example memory 80 for storing examples of grammar and words, the supplementing candidature buffer 100 for storing supplementing candidature for supplementing omitted or incomplete words, the selection command input portion 110 for selecting an appropriate candidature among nominated candidatures, and the supplementary control portion 140 for controlling operation of the neglected word supplementing portion and incomplete word supplementing portion.

Among these constructions, the character string input portion 10, the input buffer 20, the display portion 30, the word dictionary memory 40, the phrase memory 50, the neglected word supplementing portion 70, the example memory 80, the incomplete word supplementing portion 90, the supplementing candidature buffer 100 and the selection command input portion 110 are the same as those in the first embodiment and will be represented by the same reference numerals. Detailed discussion for those common elements will be neglected for simplification of this disclosure.

The incomplete input indicative sign input portion 130 is a means for inputting the incomplete input indicative sign indicative of omission of part of the word or omission of a word in a phrase. The incomplete input indicative sign input portion 130 may be realized by the input device, such as the pointing device, the key board and so forth. It is also possible to realize the incomplete input indicative sign input portion 130 by the same device to the character string input portion 10. As the incomplete input indicative sign is used for example a specific pattern, a specific character, a specific key input, a designation of a specific region on the display screen, or an interval between the characters. Incomplete words may be further discriminated by adding discrimination of a number of omitted characters, kind (capital or small letters) of the omitted characters and so forth.

The illustrated embodiment of the incomplete input indicative sign input portion 130 is differentiated from the incomplete input indicative sign input portion 60 in the former embodiment. The illustrated embodiment does not discriminate where the omission is the whole word in the phrase instead of the part of the word as in the former embodiment. By this, when a composite character string is input, even when the corresponding word is not registered in the word dictionary memory 40, the form supplemented the incomplete portion can be predicted as long as the composite word is registered in the example memory 80 to have the structure based on the examples.

The supplementing control portion 140 is a means for controlling the neglected word supplementing portion 70 and the incomplete word supplementing portion 90 according to the content of storage of the input buffer 20. When the character string stored in the input buffer is the character string with the incomplete input indicative sign containing the incomplete input indicative sign, the neglected word supplementing portion 70 and the incomplete word supplementing portion 90 are operated so that the resultant candidature may be stored in the supplementing candidature buffer 100. Then, the candidatures in the supplementing candidature buffer 100 are displayed for user's selection. Then, in response to the input from the selection command input portion 110, the incomplete input indicative sign is replaced with the character or character string and then stored in the phrase memory 50.

Next, consider for example when the character string "multi*" is input for "multi-tasking" in incomplete form with partial omission. Here, it should be noted that "*" is the incomplete input indicative sign indicative of omission of a part of a word or of a word in the phrase.

Figure 16:
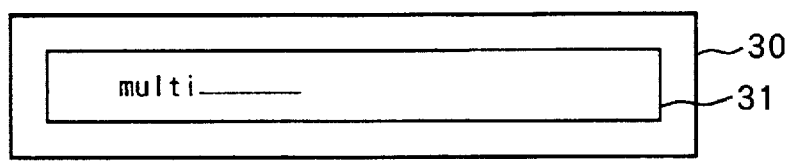
FIG. 16 is an illustration showing an example of a display in the second embodiment.

At first, the character string and the incomplete input indicative sign are input from the character string input portion 10 and the incomplete input indicative sign input portion 130 (see FIG. 16).

Next, the character string with the incomplete input indicative sign is stored in the input buffer 20. In the illustrated embodiment, "multi* is stored in the input buffer 20.

Next, the supplementing control portion 140 triggers the neglected word supplementing portion 70 since the character string with the incomplete input indicative sign contains the incomplete input indicative sign indicating omission of a part of the word.

Next, the neglected word supplementing portion 70 makes reference to the word dictionary memory 40, retrieves words consisting of an arbitrary character string, such as "multiple", multiprocessors starting from "multi". The result of retrieval is stored in the supplementing candidature buffer 100.

Then" the incomplete word supplementing portion 90 makes a comparison of the example memory 80 and the character string with the incomplete input indicative sign "multi*" in the input buffer 20 to retrieve "multi-tasking". Then, "tasking" is stored in the supplementing candidature buffer 100 as the candidature.

Next, the supplementing control portion 140 displays the content of the supplementing candidature buffer 100 on the display portion 30 and waits for the input from the selection command input portion 110.

Finally, the supplementing control portion 140 replaces the incomplete input indicative sign with the character string "tasking" to store the character string "multi-tasking" as the result in the phrase memory 50.

As set forth above, with the illustrated embodiment, even when the word is not registered in the word dictionary memory 40, the word can be predicted by retrieving the example memory 80 by command of the user if the example is registered in the example memory 80.

Figure 17:
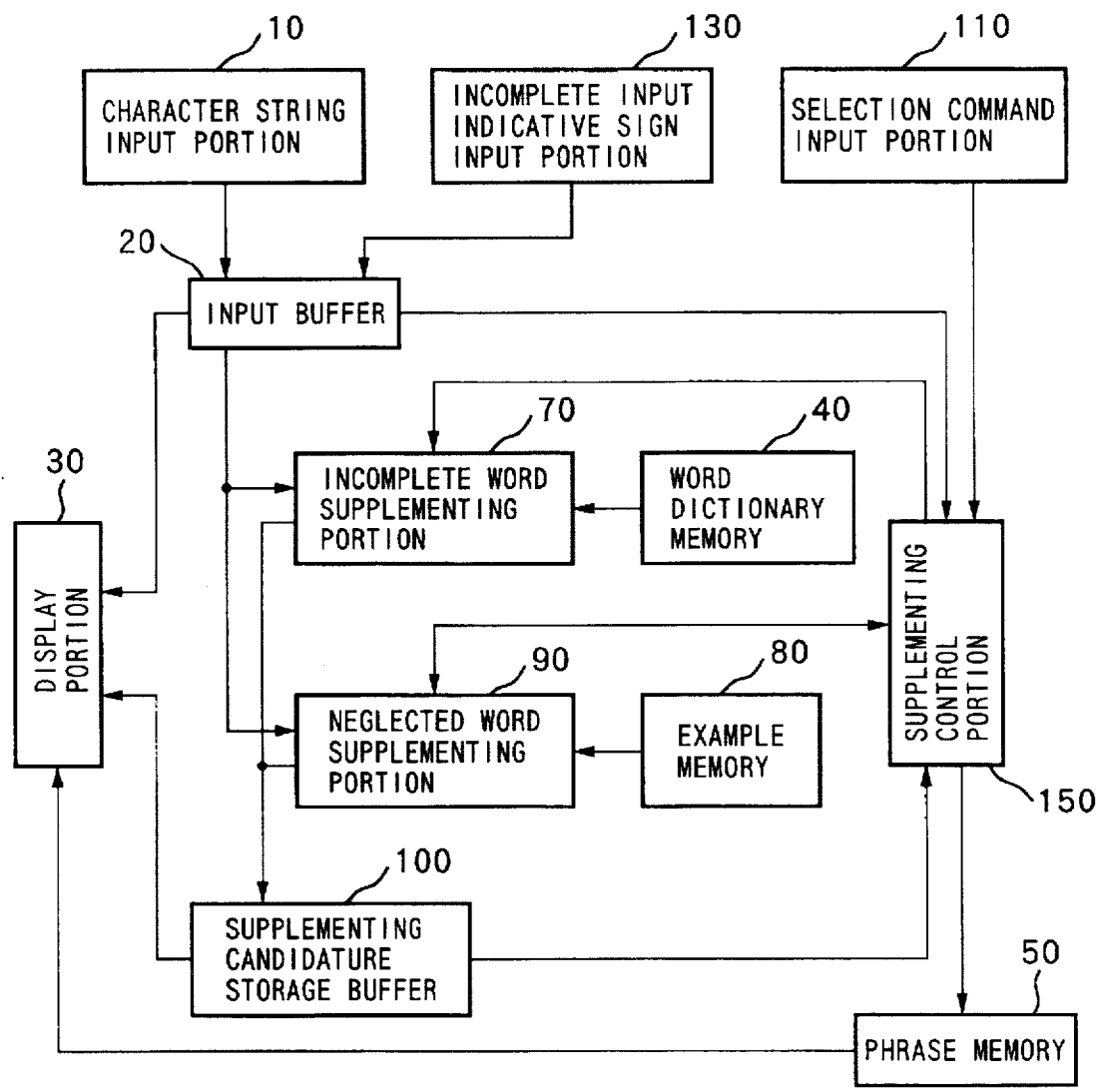
FIG. 17 is a block diagram of the third embodiment of a character string input system according to the present invention.

FIG. 17 is a block diagram showing the construction of the character input device according to the present invention.

As shown in FIG. 17, the illustrated embodiment of the character string input system comprises a character string input portion 10 for inputting the character string, the input buffer 20 for temporarily storing the input character string, the display portion 30 for displaying the input character string and the generated phrase, the word dictionary memory 40 storing data relating to expression of the words, the phrase memory 50 for storing a generated phrase, an incomplete input indicative sign input portion 130 for inputting an incomplete input indicative sign indicative of presence of an incomplete word in the input character string, the neglected word supplementing portion 70 and the incomplete word supplementing portion 90 for supplementing omitted or incomplete words, the example memory 80 for storing examples of grammar and words, the supplementing candidature buffer 100 for storing supplementing candidature for supplementing neglected or incomplete word, the selection command input portion 110 for selecting an appropriate candidature among nominated candidatures, and the supplementary control portion 150 for controlling operation of the neglected word supplementing portion and incomplete word supplementing portion.

Among these constructions, the character string input portion 10, the input buffer 20, the display portion 30, the word dictionary memory 40, the phrase memory 50, the neglected word supplementing portion 70, the example memory 80, the incomplete word supplementing portion 90, the supplementing candidature buffer 100 and the selection command input portion 110 are the same as those in the first embodiment, and the incomplete input indicative sign input portion 130 is the same as that in the second embodiment. These elements will be represented by the same reference numerals. Detailed discussion for those common elements will be omitted for simplification of this disclosure.

The supplementing control portion 150 is a means for controlling the neglected word supplementing portion 70 and the incomplete word supplementing portion 90 according to the content of storage of the input buffer 20. When the character string stored in the input buffer is the character string with the incomplete input indicative sign containing the incomplete input indicative sign, the neglected word supplementing portion 70 is operated so that the resultant candidature may be stored in the supplementing candidature buffer 100. Then, the candidatures in the supplementing candidature buffer 100 are displayed on the display portion 30 for user's selection. Then, in response to the input from the selection command input portion 110, the incomplete input indicative sign is replaced with the character or character string and then stored in the phrase memory 50. When no candidature is obtained or operation of the incomplete word supplementing portion 90 is commanded through the selection command input portion 110, the supplementing control portion 150 controls the incomplete word supplementing portion 90 to store the candidatures in the supplementing candidature buffer 100.

Then, the candidatures for supplementing are displayed on the display portion 30. Then, in response to input through the selection command input portion 110, the incomplete input indicative sign is replaced with the character string corresponding to the selected candidature to store the resultant character string in the phrase memory 50.

Next, the character string "multi*" is input for "multi-tasking" in incomplete form with partial omission. Here, it should be noted that "*" is the incomplete input indicative sign indicative of omission of a part of a word or a word in the phrase.

At first, the character string and the incomplete input indicative sign are input from the character string input portion 10 and the incomplete input indicative sign input portion 130 (see FIG. 16).

Next, the character string with the incomplete input indicative sign is stored in the input buffer 20. In the illustrated embodiment, "multi*" is stored in the input buffer 20.

Next, the supplementing control portion 150 triggers the neglected word supplementing portion 70 since the character string with the incomplete input indicative sign contains the incomplete input indicative sign indicating omission of a part of the word.

Next, the neglected word supplementing portion 70 makes reference to the word dictionary memory 40, retrieves words consisting of an arbitrary character string, such as "multiple", or multiprocessors starting from "multi". The result of retrieval is stored in the supplementing candidature buffer 100. Here, since "multi-tasking" is not registered in the word dictionary memory 40, a command for prediction by the incomplete word supplementing portion 90 is input through the selection command input portion 110.

In response to this, the supplementing control portion 150 triggers operation of the incomplete word supplementing portion 90.

The incomplete word supplementing portion 90 makes a comparison of the example memory 80 and the character string with the incomplete input indicative sign "multi*" in the input buffer 20 to retrieve "multi-tasking". Then, "tasking" is stored in the supplementing candidature buffer 100 as the candidature.

Next,, the supplementing control portion 140 displays the content of the supplementing candidature buffer 100 on the display portion 30 and wait for the input from the selection command input portion 110.

Finally, the supplementing control portion 140 replaces the incomplete input indicative sign with the character string "tasking" to store the character string "multi-tasking" as the result in the phrase memory 50.

As set forth above, with the illustrated embodiment, even when the word is not registered in the word dictionary memory 40, the word can be predicted by retrieving the example memory 80 by command of the user if the example is registered in the example memory 80. In addition, by the process as set forth above, since retrieval of the example memory 80 is performed only when the desired word is not registered in the word dictionary, higher speed retrieval than the foregoing second embodiment becomes possible.

As set forth above, since the character string input system of the illustrated embodiment permits input of a word and/or phrase with omission of a part of the word or a word in the phrase, keystrokes for entry of the word and/or phrase can be reduced.

Also, even when the phrase contains the word which the user cannot write, it becomes possible to input the phrase with omission of the difficult word. Then, the illustrated embodiment of the system may retrieve and display the predicted candidatures to enable completion of the input phrase.

Furthermore, for the portion supplemented by the illustrated embodiment, a spelling error due to incorrect memory of the user may be successfully avoided.

Figure 18:
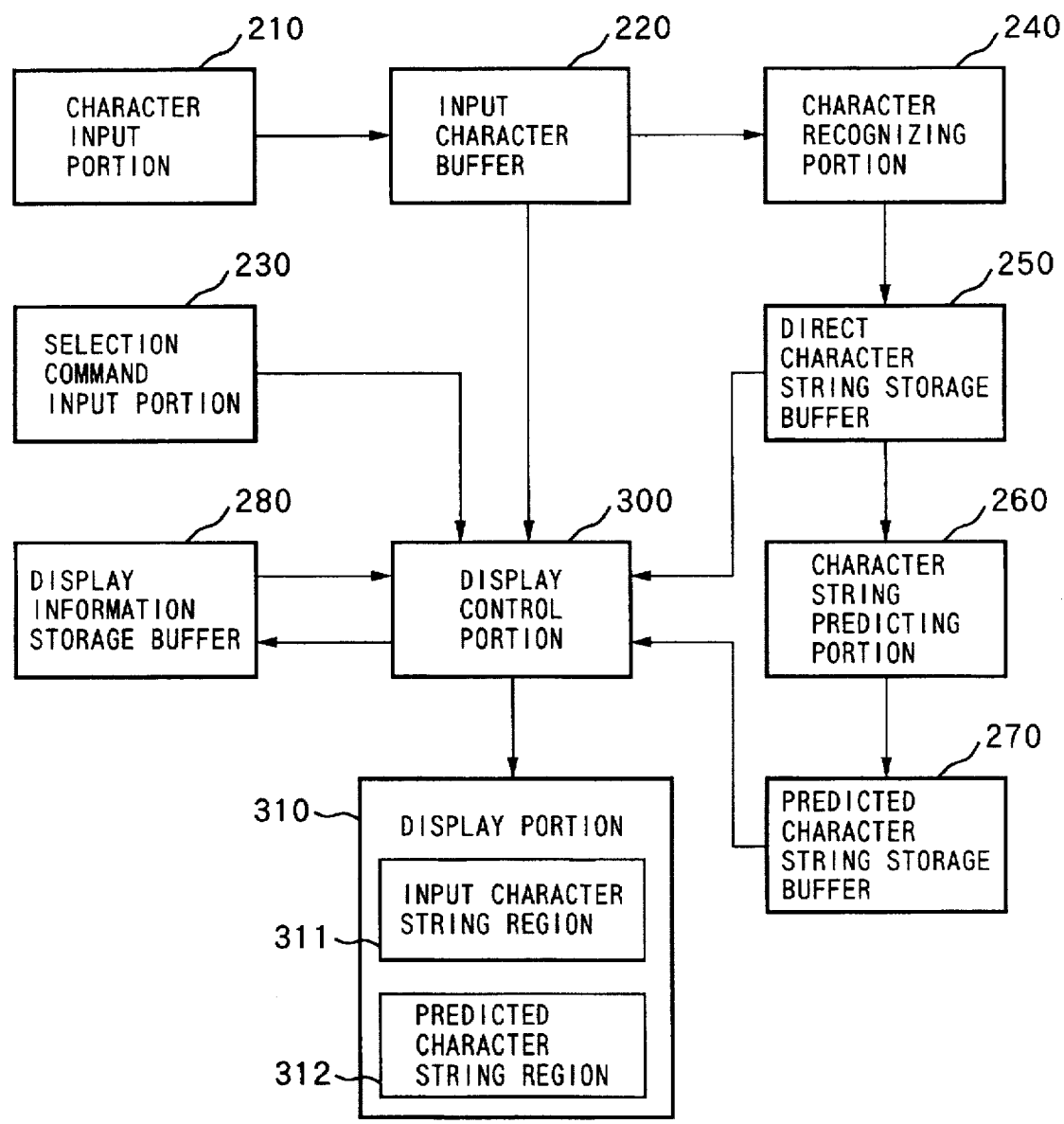
FIG. 18 is a block diagram of the fourth embodiment of a character string input device according to the present invention.

FIG. 18 is a block diagram showing the fourth embodiment of a character string input system according to the present invention.

As shown in FIG. 18, the illustrated embodiment of the character string input system comprises a character string input portion 210 for inputting a character string, an input character buffer 220 for temporarily storing the input character string, a selection command input portion 230 for inputting a command for selection and instruction, a character recognizing portion 240 for performing character recognition of the input character, a direct character string storage buffer 250 for storing a recognized character string, a character string predicting portion 260 for predicting a character string following the character string stored in the direct character string storage buffer 250, a predicted character string storage buffer 270 for storing predicted candidatures of character strings, a display information storage buffer 280 for displaying a character string, for which input character string processing is completed, a display control portion 300 and a display portion 310.

The character string input portion 210 receives trace data or pattern data of a handwritten character. The character string input portion 210 may be realized by a pointing device and a plane which may detect the pointing position as two-dimensional coordinate data. In the already commercialized pen type computer, the character string input portion 210 has been realized by a stylus pen and a tablet. Also, the character string input portion 210 may be realized by pointing on a touch panel by a finger, or by employing a mouse as the pointing device.

The input character buffer 220 is a buffer storing trace data sampled by the character string input portion 210. The input character buffer 220 may be realized by a storage device, such as an IC memory. The trace data is expressed by x-coordinate, y-coordinate and time in the buffer.

The selection command input portion 230 is designed for inputting a command for selection or verification. As the input means, means for inputting a command by depressing a predetermined key in the keyboard, means utilizing physically the same device to the character string input portion 210 for inputting the command by pointing a specific region and so forth may be employed.

The character recognizing portion 240 performs character recognition for the trace data stored in the input character buffer 220 and derives a character code corresponding thereto. The character recognizing portion 240 may be realized with a handwritten character recognizing portion of the pen computer. The basic flow of character recognition process is that, at first the characteristic amount is extracted from the trace data, and then the derived characteristic amount is compared with the similar characteristic amount preliminarily obtained for standard characters as objects for recognition, and a closest one is determined as the result of recognition. When the candidate character as the result of recognition becomes more than one and cannot be restricted to one, reference is made to the word dictionary as a combination with the leading and trailing characters. Furthermore, by checking a grammatical connection, the most likely candidate character is selected in the light of the language.

The direct character string storage buffer 250 is a buffer for storing the character string encoded into the character code by the character recognizing portion 240. The direct character string storage buffer 250 may be realized by a storage device, such as an IC memory or so forth. Hereinafter, the input character string to be stored in the direct character string storage buffer 250 will be referred to as a "direct character string". The direct character string storage buffer 250 may store the direct character string by associating the order of input and the input position. When the recognition result cannot be determined in straightforward manner in the character recognizing portion 240, it may be possible to store a plurality of candidate characters.

The character string predicting portion 260 generates a candidate character immediately following the direct character string in the direct character string storage buffer 250. By retrieving word forward matching with the direct character string from the word dictionary, the prediction of the word level can be realized, namely, by taking the word matching with the direct character string in a forward portion from the word dictionary. Then, the remaining portion of the taken out word matching at the front portion after removal of the matched characters should be the predicted character string. When a plurality of candidatures of the character string is present, all of those character strings should become the candidatures of the character string.

Figure 19:
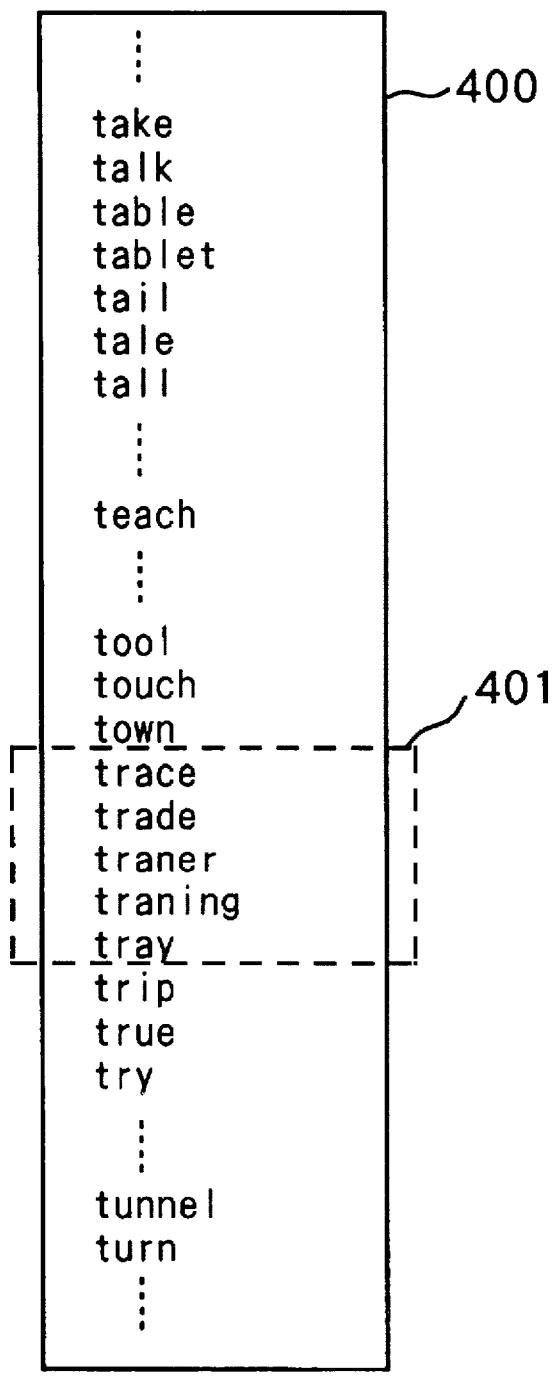
FIGS. 19 and 20 are explanatory illustrations showing a manner of determining a predicted character string.
Figure 20:
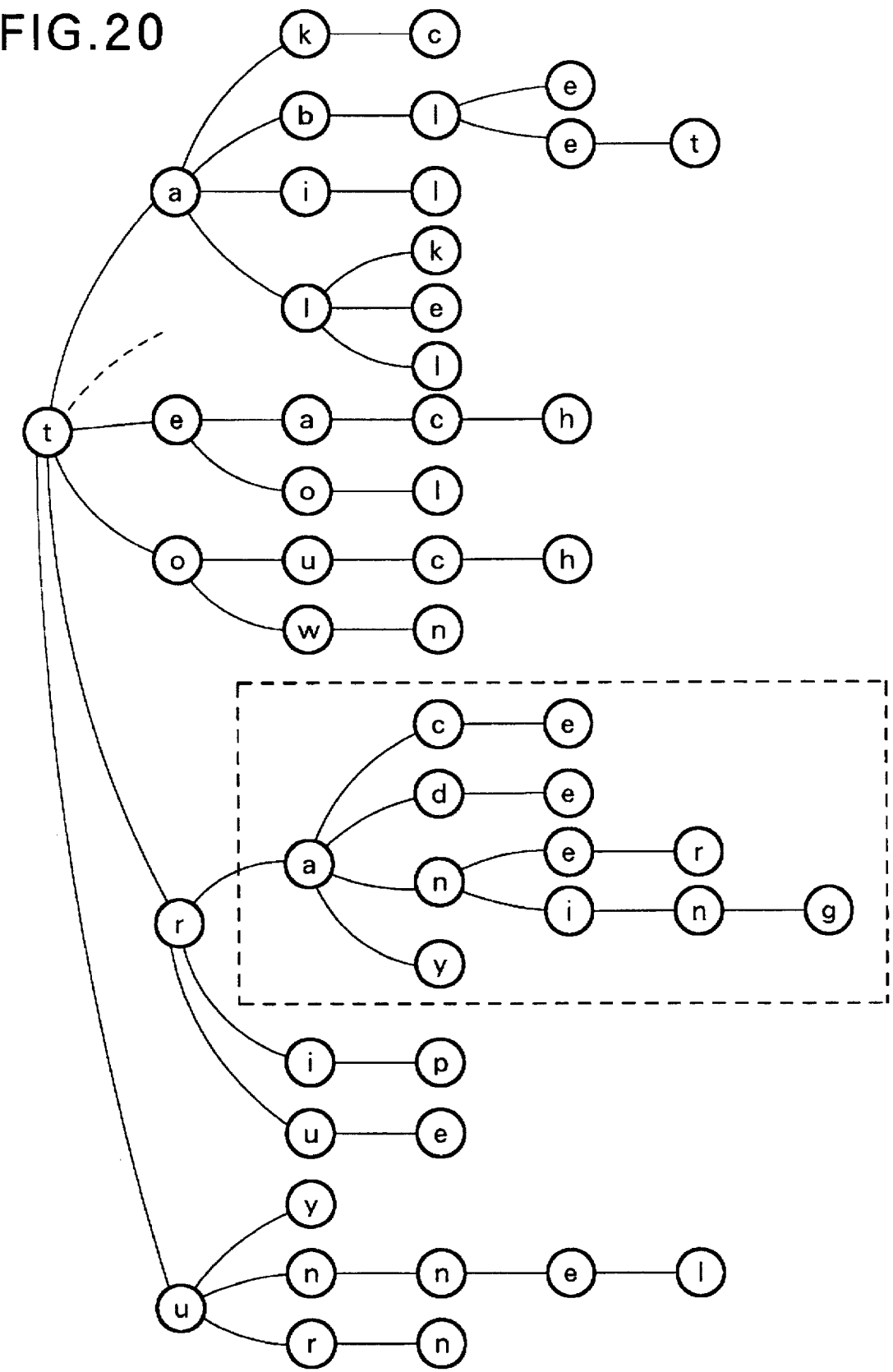

FIG. 19 shows an example of a word dictionary 400. In FIG. 6, the words are ordered according to the order of the character code. For instance, when the direct character is "tra", the forward matching words thereof are "trace", "trade", "traner", "training", "tray" in the range 401 enclosed by the broken line. Accordingly, as the predicted character strings with respect to the direct character "tra", the predicted character strings becomes "ce", "de", "ner", "ning" and "y". For retrieving matching of the forward portion, a digit retrieval type as shown in FIG. 20 is effective as the structure of the word dictionary. When the digit retrieval type word dictionary 402 as illustrated in FIG. 20 is employed, by restricting retrieving range from the first character to a second character in the word dictionary 402, the subsequent characters become candidatures of the character string. Namely, the predicted character string with respect to "tra" can be obtained as a region 403.

The predicted character string storage buffer 270 is a buffer for storing the candidate character strings generated by the character string predicting portion 260. The predicted character string storage buffer 270 may be realized by the storage device, such as the IC memory and so forth. In the predicted character string storage buffer 270, the predicted character strings are stored as character code strings. If there is a possibility of having a plurality of predicted character strings, those of a plurality of predicted character string candidatures are all stored as the candidatures of the predicted character string. Then, when an order corresponding to the likelihood among a plurality of the predicted character strings can be set, the predicted character string may be ordered in that order. In the alternative, it may also be possible to add the order information for respective predicted character strings.

The display device 310 can be realized by a CRT display or a liquid crystal display and so forth. On the other hand, like the recent pen computer and so forth, it may be possible to employ a liquid crystal table which functions both as the tablet as the character string input portion 210 and the liquid crystal display. Also, when the touch panel is employed as the character string input portion 210, the character string input portion 210 and the display portion 310 may be realized as physically integrated fashion. In the illustrated embodiment, the display portion 310 defines an input character string region 311 and a predicted character string region 312.

The display information storage buffer 280 is a buffer for storing information to be displayed on the display portion 310. The display information storage buffer 280 may be realized by the storage device, such as an IC memory. The displayed information is the content to be displayed, the position to display and its attribute (color and so forth).

The display control portion 300 is a means for forming the content of the display information storage buffer 280 on the basis of the contents of input character buffer 220, the direct character string storage buffer 250 and the command from the selection command input portion 230, and controlling the display content of the display portion 310 In concrete, the display control portion 300 performs controls through the following processes. At first, the trace data in the input character buffer 220 is temporarily displayed in the input character string region 311 of the display portion 310. When the operation of the character recognizing portion 240 is completed, in place of the temporarily stored trace data, the character string corresponding to the content of the direct character string storage buffer 250 is re-displayed on the predicted character string region 312. On the other hand, in the predicted character string region 312, the candidates of the character string are displayed. Then, from the selection command input portion 230, the command for selection of the candidate is input to the display portion 310. Then, at the trailing end of the character string, the candidature of the selected character string is added so as to be displayed together with the front portion.

Figure 21:
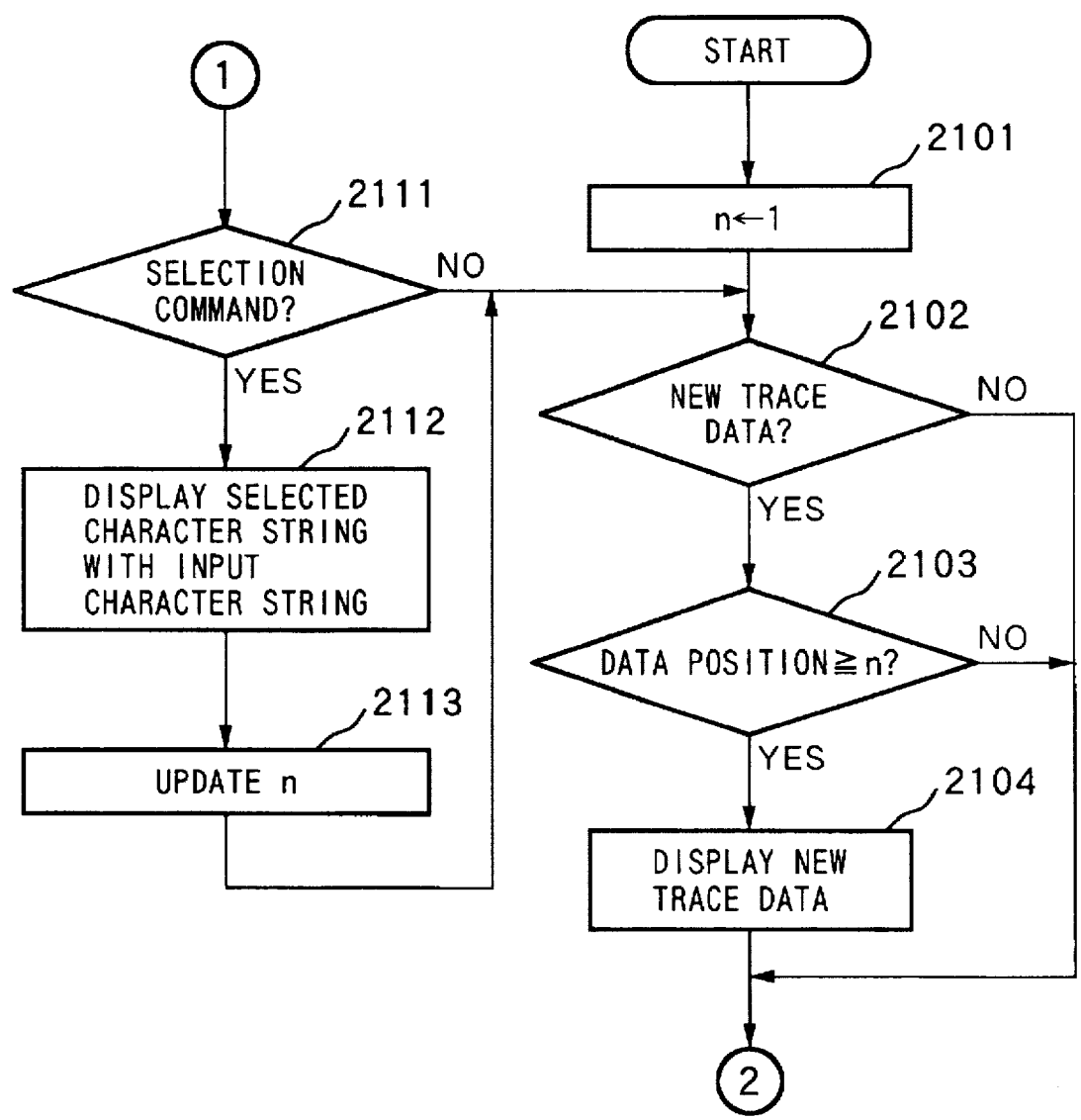
FIGS. 21 and 22 are a series of flowcharts showing an operation of the fourth embodiment of the character string input system.

Next, the operation of the display control device will be discussed with reference to the flowcharts of FIGS. 21 and 22.

In the drawings, the reference sign n represents a value indicative of the character concerned. Namely, when n=1, it represents the first character in the input character string region 311 of the display portion 310.

At first, in the display control portion 300, the sign n is initially set at a value 1 (step 2101). Then, the character input is performed by the character input portion 210, and a fresh trace data is stored in the input character buffer 220. Then, the display control portion 300 checks the position of the trace data (steps 2102 and 2103). Then, if the position of the trace data is the position of the nth character concerned or a lower order than the nth character, the trace data is displayed on the input character string region 311 of the display portion 310 (step 2104).

Subsequently, in the character recognition portion 240, character recognition is performed to store a new character in the direct character string storage buffer 250. Then the display control portion 300 displays the new character on the input character string region 311 in place of the trace data (steps 2105 and 2106). At this time, the character string predicting portion 260 performs prediction for the character following the new character to store the predicted character in the predicted character string storage buffer 270.

Then, the display control portion 300 sets the character concerned to the character next to that currently concerned.

Then the candidature of the character string including the currently concerned character and the subsequent characters is read out from the predicted character string storage buffer 270 (steps 2107 and 2108). Then, the read out predicted character string is displayed on the predicted character string region 312 of the display portion 310 (steps 2109 and 2110).

With respect to the predicted character string displayed on the predicted character string region 312, if a selection command is entered for the appropriate character string candidature from the selection command input portion 230, the display control portion 300 adds the selected predicted character string to the character string displayed on the input character string region 311 at the position of the character concerned and the subsequent character position (step 2112). Then, the value indicative of the character position to be concerned is updated by adding the length of the newly added character string. Then, the process waits for the new trace data.

The operation set forth above will be discussed in a more concrete manner with reference to FIGS. 23A to 23F.

Figure 23A:
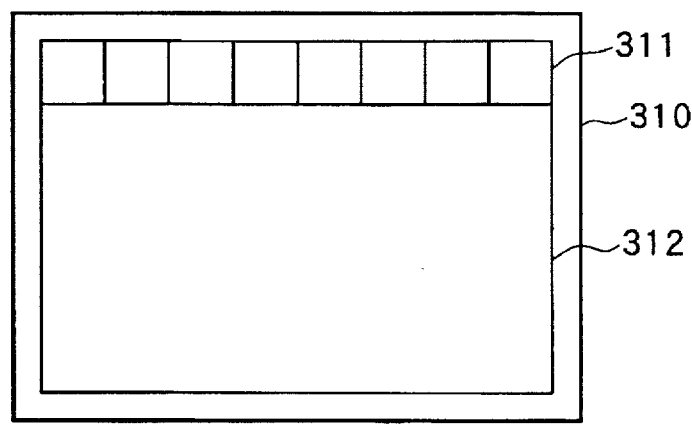
FIGS. 23A to 23F are illustrations showing a display in inputting a character string.

FIG. 23A shows the condition where nothing is input. As can be seen, the input character string region 311 and the predicted character string region 312 are provided as separate regions in the display control portion 300. At this time, the word "traning" is assumed to be input. The process of inputting the character will be discussed.

Figure 23B:
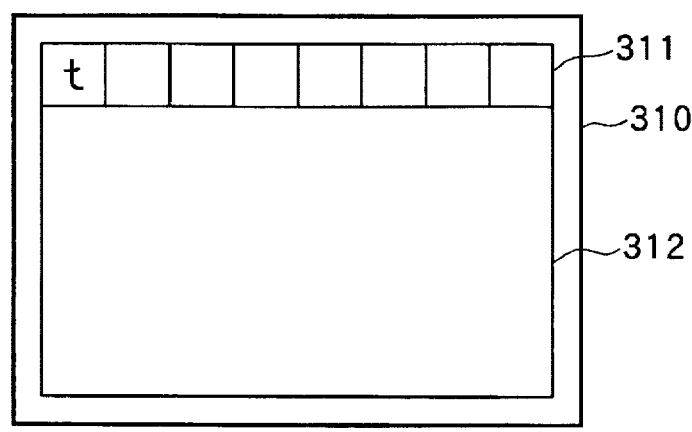

In FIG. 23B, a character "t" is written in by handwriting. This is the state where the trace data is input to the input character buffer 220 from the character input portion 210 and stored therein, which is displayed through the operation at the step 2104 of FIG. 21.

When one handwritten character is entered, as the result of process in the character recognition portion 240, the character code of "t" is stored in the direct character string storage buffer 250. At this stage, the answer at the step 2105 becomes positive. Then, by the step 2106, in place of the handwritten character "t" displayed, the encoded character code "t" is displayed on the input character string region 311.

Thereafter, by the character string predicting portion 260, the character string subsequent to "t" is predicted. Then, the candidate character string or character strings are stored in the predicted character string storage buffer 270. At this stage, the process is advanced to steps 2109 and 2110 of FIG. 22. On the predicted character string region 312, the candidate character strings subsequent to "t" are displayed. The display at this condition is as illustrated in FIG. 23C. At this stage, one of the candidate character strings in the predicted character string region 312 may be selected. However, the following discussion will be given for the case where selection is not made.

Figure 23C:
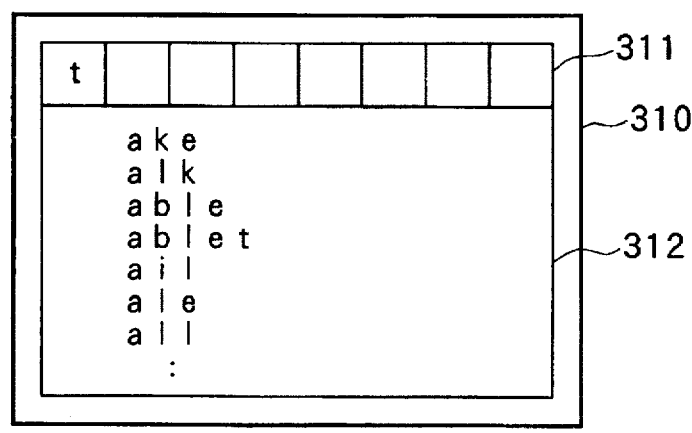
Figure 23D:
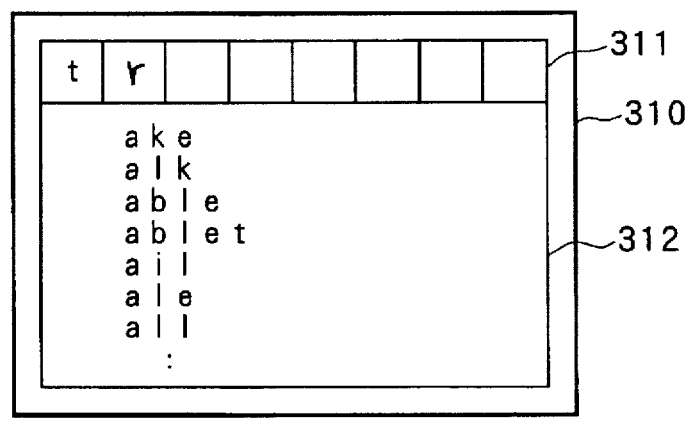
Figure 23E:
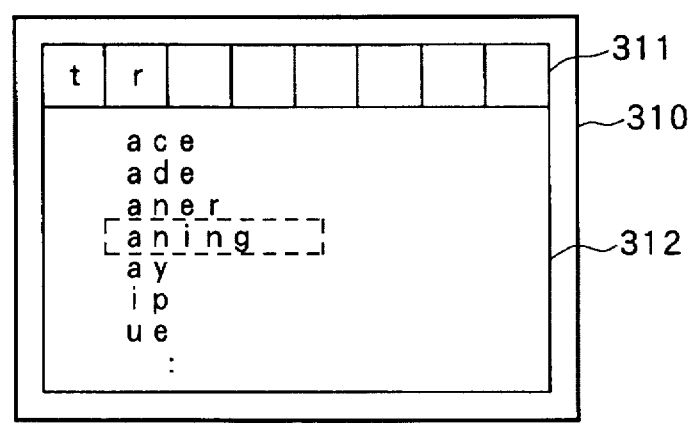
Figure 23F:
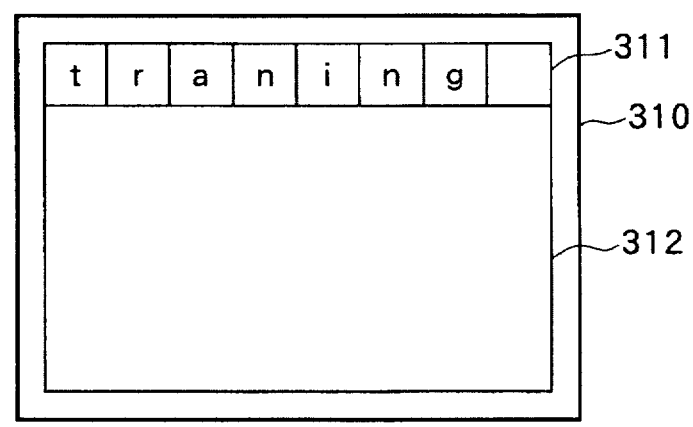

The state where "r" is written following to "t" is illustrated in FIG. 23D. When "r" is input, the display on the input character string region 311 is varied to include the handwritten character "r". Through the process set forth above, the handwritten character "r" is recognized and the display on the input character string region 311 is changed to display encoded character codes of "tr" is displayed. Then, the character strings following "tr" is predicted by the character string predicting portion 260 and displayed on the predicted character string region 312 of the display portion 310. FIG. 23E shows the display at this stage. In the illustrated example, among the candidate character strings displayed on the predicted character string region 312, "aning" is selected by the selection command input portion 230. This corresponds to branching of the process to the YES branch at the step 2111. At step 2112, a selected dedicated character string "aning" is displayed on the input character string region 311 subsequent to the input characters if to tr This condition is illustrated in FIG. 23F.

While sections are defined in the input character string region 311 for respective characters in the discussion for the operation set forth above, it is not essential to provide such independent sections for displaying respective characters. Also, the configuration and the positional relationship between the input character string region 311 and the predicted character string region 312 and so forth are not specified to the shown example. Furthermore, it may be possible to shift the position of the predicted character string region 312 depending upon the input characters, and to vary the size of the predicted character string region 312 depending upon the number of candidate character strings. Also, while only parts of the predicted character strings are displayed on the predicted character string region 312 in the example of FIGS. 23A to 23F, it may be possible to display the candidate character strings as fully spelled words. In addition, a relationship of timing between the timing to input the next character and a timing of switching the displayed characters on the display screen may be arbitrarily selected.

On the other hand, the order of displaying of the candidate character strings may be arbitrarily determined in any order, such as the order of the character codes, the order of the length of the character strings, the order of preference given based on a predetermined rule, such as frequency of selection or so forth. Also, when a number of the candidate character strings are greater than a predetermined value, it may be possible not to display the candidate character strings since it is unlikely the desired character string will be selected from such a large number of candidatures.

Figure 24:
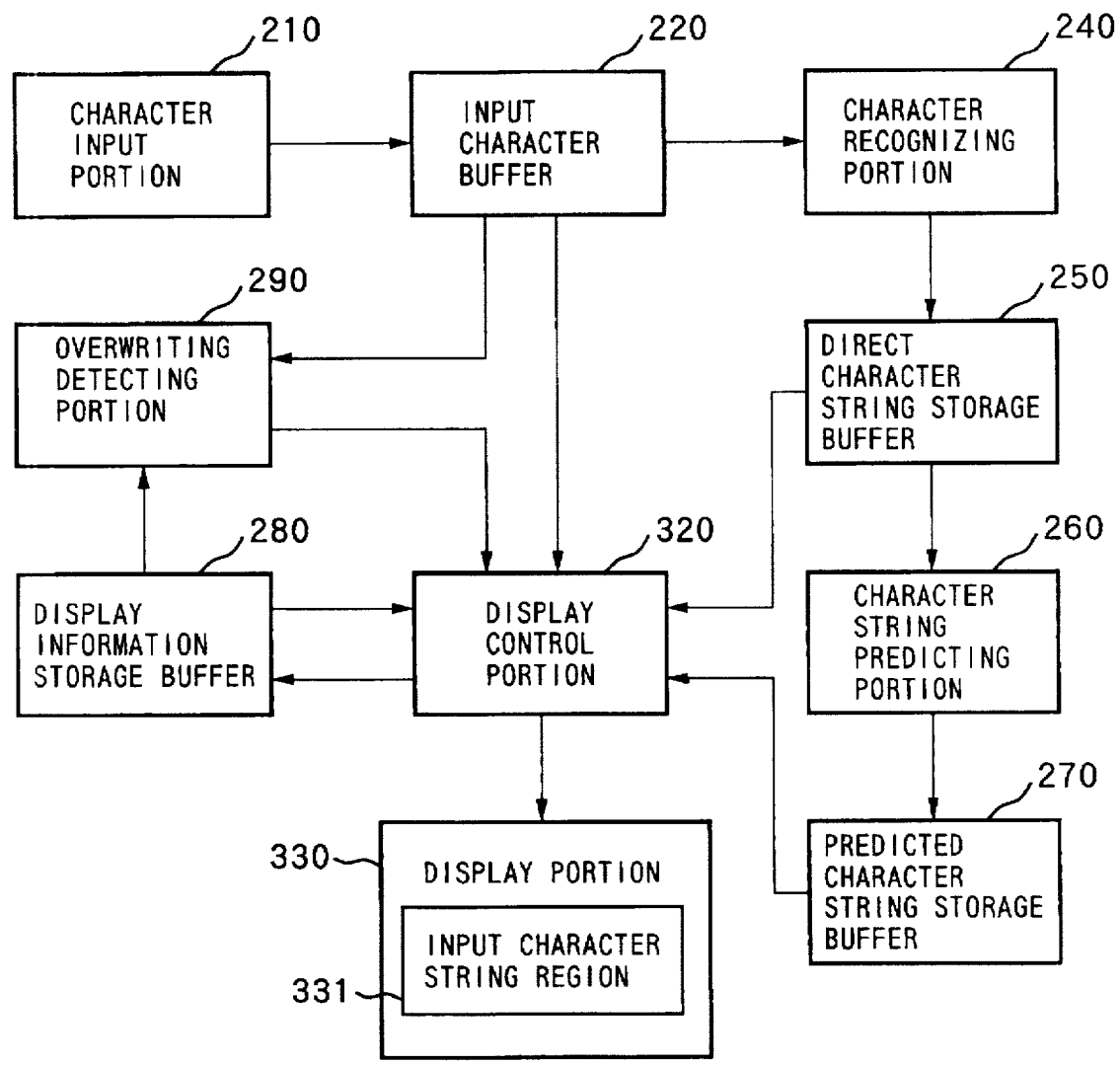
FIG. 24 is a block diagram of the fifth embodiment of a character string input device according to the present invention.

FIG. 24 shows a block diagram showing the construction of the fifth embodiment of the character string input system according to the present invention.

As shown in FIG. 24, the illustrated embodiment of the character string input system comprises a character string input portion 210 for inputting a character string, an input character buffer 220 for temporarily storing the input character string, a character recognizing portion 240 for performing character recognition of the input character, a direct character string storage buffer 250 for storing a recognized character string, a character string predicting portion 260 for predicting a character string following the character string stored in the direct character string storage buffer 250, a predicted character string storage buffer 270 for storing predicted candidatures of character strings, a display information storage buffer 280 for displaying a character string, for which input character string processing is completed, an overwriting detecting portion 290 for detecting overwriting of the input character over the predicted character string, a display control portion 320 and a display portion 330.

Among the elements set forth above, the character input portion 210, the input character buffer 220, the character recognition portion 240, the direct character string storage buffer 250, the character string predicting portion 260, the predicted character string storage buffer 270 and the display information storage buffer 280 are the same as those of the fourth embodiment. The same reference numerals will be given for these elements and a detailed discussion therefor is omitted in order to avoid redundancy.

The display portion 330 may be realized by CRT display, the liquid crystal display and so forth similarly to the foregoing fourth embodiment. Also, when the liquid crystal display tablet or touch panel is used, the character input portion 210 and the display portion 330 may be realized as a physically integrated unit. In contrast to the fourth embodiment, in which the display portion 310 has a separated input character string region 311 and a predicted character string region 312, in the illustrated embodiment, the display portion 330 has a single character string region 331 so that the predicted character string is displayed immediately following the input character string.

The overwriting detecting portion 290 is adapted to detect overwriting of the handwriting character input through the character input portion 210 on the position where the predicted character string of the character string region 331 is on the display portion 330. The coordinate range of the predicted character strings in the character string region 331 can be obtained from the display information storage buffer 280. Accordingly, the overwriting detecting portion 290 makes a comparison for the coordinate value of the trace data newly written in the input character buffer 220 with the coordinate range of the predicted character strings obtained from the display information storage buffer 280 to check whether the coordinate value of the handwritten trace is included in the coordinate range of the predicted character string. When the coordinate value of the handwritten trace is judged to be within the coordinate range of the predicted character string, an overlapping detection signal is output to a display control portion 320.

The display control portion 320 is a means for forming the content of the display information storage buffer 280 on the basis of the contents of input character buffer 220, the direct character string storage buffer 250, the predicted character string storage buffer 270 and the overwriting detecting portion 290 controlling the display content of the display portion 330. To be concrete, the display control portion 300 performs controls through the following processes. At first, the trace data in the input character buffer 220 is temporarily displayed in the input character string region 331 of the display portion 330. When the operation of the character recognizing portion 240 is completed, in place of the temporarily stored trace data, the character string corresponding to the content of the direct character string storage buffer 250 is re-displayed on the predicted character string region 312. On the other hand, in the region subsequent to the region to display the direct character string for displaying the predicted character string, one of the predicted character strings is displayed. When the overwriting detection signal is input from the overwriting detecting portion 290, the predicted character string up to that immediately prior to the position where the new character is overwritten are fixed as the input character string, and the predicted character strings at the overwritten position and subsequent position are deleted.

Next, the operation of the illustrated embodiment of the display control portion 320 will be discussed with reference to FIGS. 25 and 26.

In the drawings, the reference sign n represents a value indicative of the character concerned. Namely, when n=1, it represents the first character in the input character string region 311 of the display portion 310. On the other hand, sign m represents a value indicative of the position of the input character. Accordingly, when a position where a character is already present, is represented by the sign m, it means overwriting of the new character over the existing character at the corresponding position.

At first, in the display control portion 300, the sign n is initially set at a value 1 (step 2501). Then, the character input is performed by the character input portion 210, and a fresh trace data is stored in the input character buffer 220. Then, the display control portion 320 sets the position of the trace data as the sign m (steps 2502 and 2503). Thereafter, if the overwriting detection signal is input from the overwriting detecting portion 290, it means overwriting of the new input character over the existing character of the predicted character string at the corresponding position. Therefore, the characters in the predicted character string positioned at or subsequent to the position where the input character is overwritten are deleted. Also, in conjunction therewith, the characters in the predicted character string up to the character overwritten by the newly input character are taken as the input character string (steps 2504, 2505 and 2506). Then, the values of the signs n and m are set (step 2507), and new trace data is displayed on the input character string region 331 (step 2508).

On the other hand, when no overwriting detection signal is input from the overwriting detecting portion 290, it means that the overwriting of the input character is not made. Then, if the sign m is equal to or greater than n and if the predicted character string is displayed on the input character string region 331 of the display portion 330, all of the predicted character string is fixed as the input character string (steps 2509, 2510 and 2511). On the other hand, the new trace data is displayed on the input character string region 331 of the display portion 330 (step 2508). When no predicted character string is displayed on the display portion 330, the new trace data is displayed in the input character string region 331 of the display portion 330 (step 2510 and 2508).

Next, by the character recognition portion 240, character recognition is performed to store a new character in the direct character string storage buffer 250. Then the display control portion 320 displays the new character on the input character string region 311 in place of the trace data (steps 2512 and 2513). At this time, the character string predicting portion 260 performs prediction for the character following the new character to store the predicted character in the predicted character string storage buffer 270.

Then, the display control portion 320 sets the character concerned to the character next to that currently concerned. Then the candidature of the character string including the currently concerned character and the subsequent characters is read out from the predicted character string storage buffer 270 (steps 2514 and 2515). Then, the read out predicted character string is displayed on the predicted character string region 312 of the display portion 310 (steps 2516 and 2517).

The operation set forth above will be discussed in a more concrete manner with reference to FIGS. 27A to 27F.

Figure 27A:
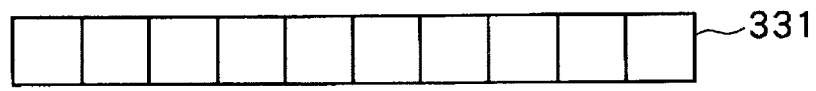
FIGS. 27A to 27F are illustrations showing display in inputting a character string.

FIG. 27A shows the condition where nothing is input. As can be seen, the input character string region 331 which is not separated into the input character string region 311 and predicted character string region 312 as in the former embodiment are not provided as separate regions in the display control portion 320. For instance, the region shown by bold letter in FIGS. 27C and 27E are the display region for the predicted character string. The following discussion will be given for the process of inputting a word "tablet" through the processes.

Figure 26:
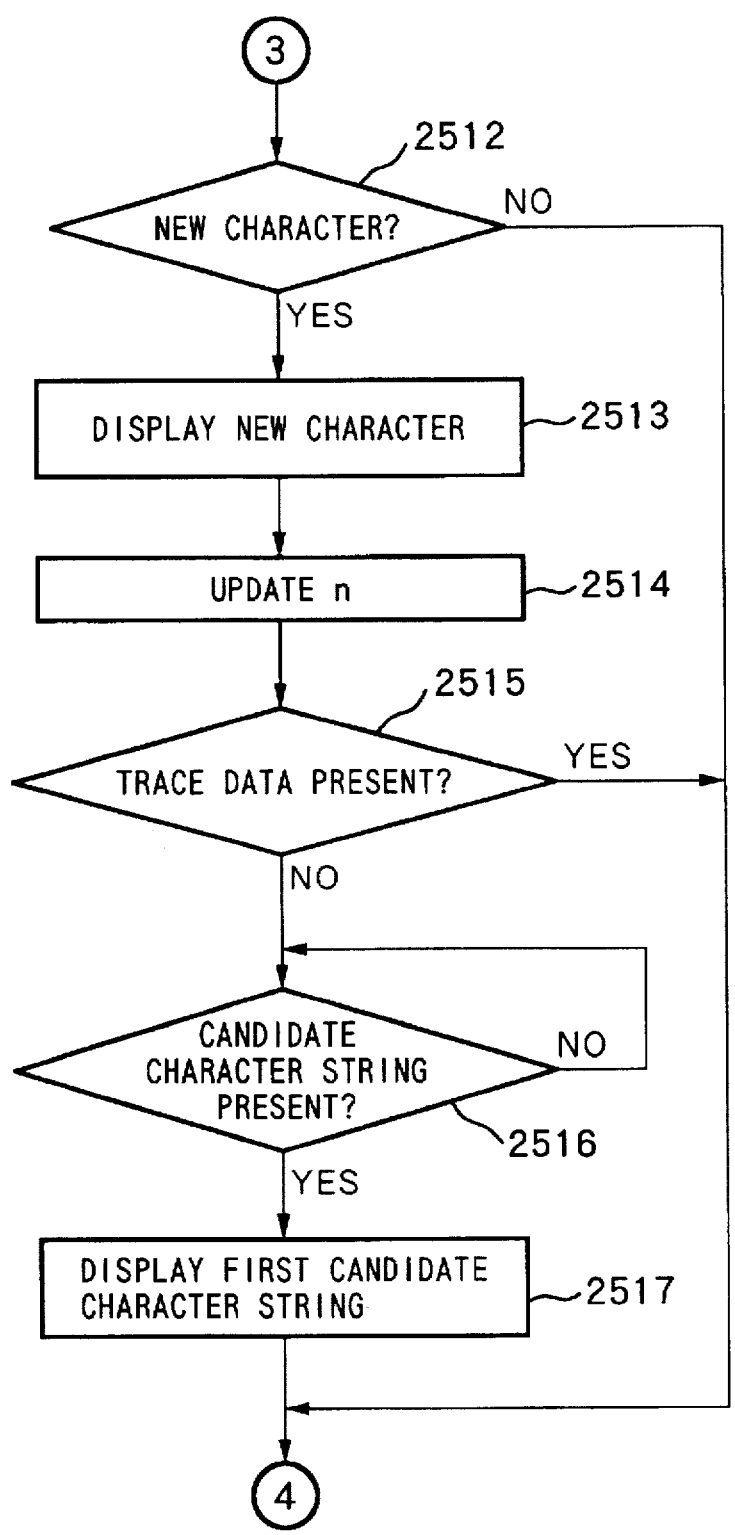
Figure 27B:
Figure 27C:

In FIG. 27B, a character "t" is written in by hand. This is the state where the trace data is input to the input character buffer 220 from the character input portion 210 and stored therein, which is displayed through the operation of a loop of step 2502 (branching to YES branch) of FIGS. 25 and 26, step 2503, step 2504 (branching to NO branch), step 2509 (branching to YES branch), step 2510 (branching to NO branch), step 2508, and step 2512 (branching to NO branch).

When one handwritten character is entered, as the result of process in the character recognition portion 240, the character code of "t" is stored in the direct character string storage buffer 250. At this stage, the answer at the step 2105 becomes positive. Then, by the step 2106, in place of the handwritten character "t" displayed, the encoded character code "t" is displayed on the input character string region 311.

Thereafter, by the character string predicting portion 260, the character string subsequent to "t" is predicted. Then, the candidate character string or character strings are stored in the predicted character string storage buffer 270. At this stage, the process is advanced to steps 2516 and 2517 of FIG. 26. Then, as the first candidate character string, "ake" is displayed. The display at this stage is illustrated in FIG. 27C. In the illustrated embodiment, by utilizing the bold letter for the predicted character string, the predicted character string is discriminated from the input character string. The method of providing distinction for the predicted character is not specified to the bold letter, but can be differentiated in color or in providing underline and other various methods. On the other hand, the reason why the first predicted character string is "ake" is that the first word beginning "t" is "take" in the word dictionary 400. However, what is to be displayed in the predicted character string display region as a first one when a plurality of candidate character strings are present, is not specified in the order in the word dictionary, but can be determined arbitrarily. For instance, order of the length of the character strings (the longest one is taken as the first candidate character string), order in the meaning of the words, order based on learning (giving preference to the character string appearing in the past) and other orders may be taken.

The character string "take" predicted up to this stage is different from the intended character string "tablet". However, since the predicted character string matches with the intended character string up to "ta". Therefore, it is required to rewrite "ke". Namely, the second character "a" can be taken as is. Therefore, over the third character "k", "b" is overwritten. Upon starting overwriting to the display region for the predicted character string in the input character string region-331, the flowchart of FIG. 25 is executed through the steps of step 2502 (branching to YES branch), the step 2503, and the step 2504 (branching to YES branch). Then, by the step 2505, the characters in the predicted character string at and subsequent to the overwritten position are erased. Then, at the step 2506, the predicted character string ("a" in the shown case) preceding the overwritten character position, are fixed as the input character string. Then, the handwritten character "b" is displayed through the loop of the step 2508, 2512 (branching to NO branch), the step 2502 (branching to YES branch), the step 2503, the step 2504 (branching to NO branch), the step 2509 (branching to YES branch, the step 2510 (branching to NO branch) and the step 2508, as shown in FIG. 27D.

The state where the handwritten character "b" is encoded into the character code and re-displayed and predicted character string subsequent to "b" is displayed is illustrated in FIG. 27E. As can be seen, immediately following "tab", "le" are displayed as the predicted character string in reversed display.

Figure 27D:
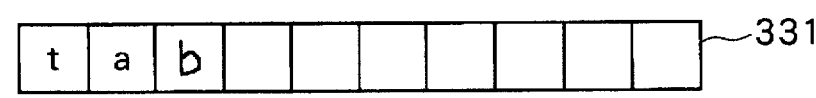
Figure 27E:
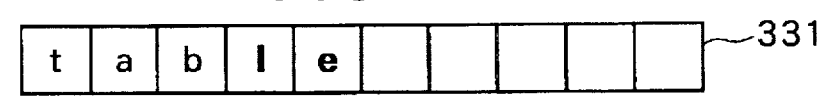
Figure 27F:
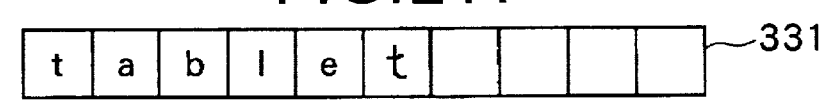

Since this character string matches with the desired character string, overwriting is not necessary as that required in the case of FIGS. 27D and 27E. Therefore, at the position subsequent to "table", "t" is handwritten w¥ as a fresh character. At this time, in the flowchart of FIGS. 25 and 26, the process is performed through the step 2502 (branching to YES branch), the step 2503, the step 2504 (branching YES branch), the step 2509 (branching to YES branch), the step 2510 (branching to YES branch), the step 2511 and the step 2508. At the stage of the step 2511, "ble" displayed as the predicted character string is fixed as the input character string. Then, the handwritten character "t" is displayed at the end of the displayed character string. The display at this stage becomes as illustrated in FIG. 27F.

In addition to the basic flow of the process set forth above, discussion will be given for the case where the process is branched to YES branch at the step 2515 of FIG. 26. Such branching is caused in the case where, before the "t" is encoded into the character code from the state of FIG. 27B, the next handwritten character "a" is input through the character input portion 210. In such case, when "t" is encoded into the character code, the next character is already been written. In the illustrated embodiment, a prediction ignoring such subsequently input character is not performed. Namely, in such case, the processes in the steps 2515 and 2517 are not performed.

It should be noted that while the example of display in FIGS. 27A to 27F has sections each accepting one character, such divided sections are not essential to the present invention similarly to the foregoing first embodiment.

Figure 28:
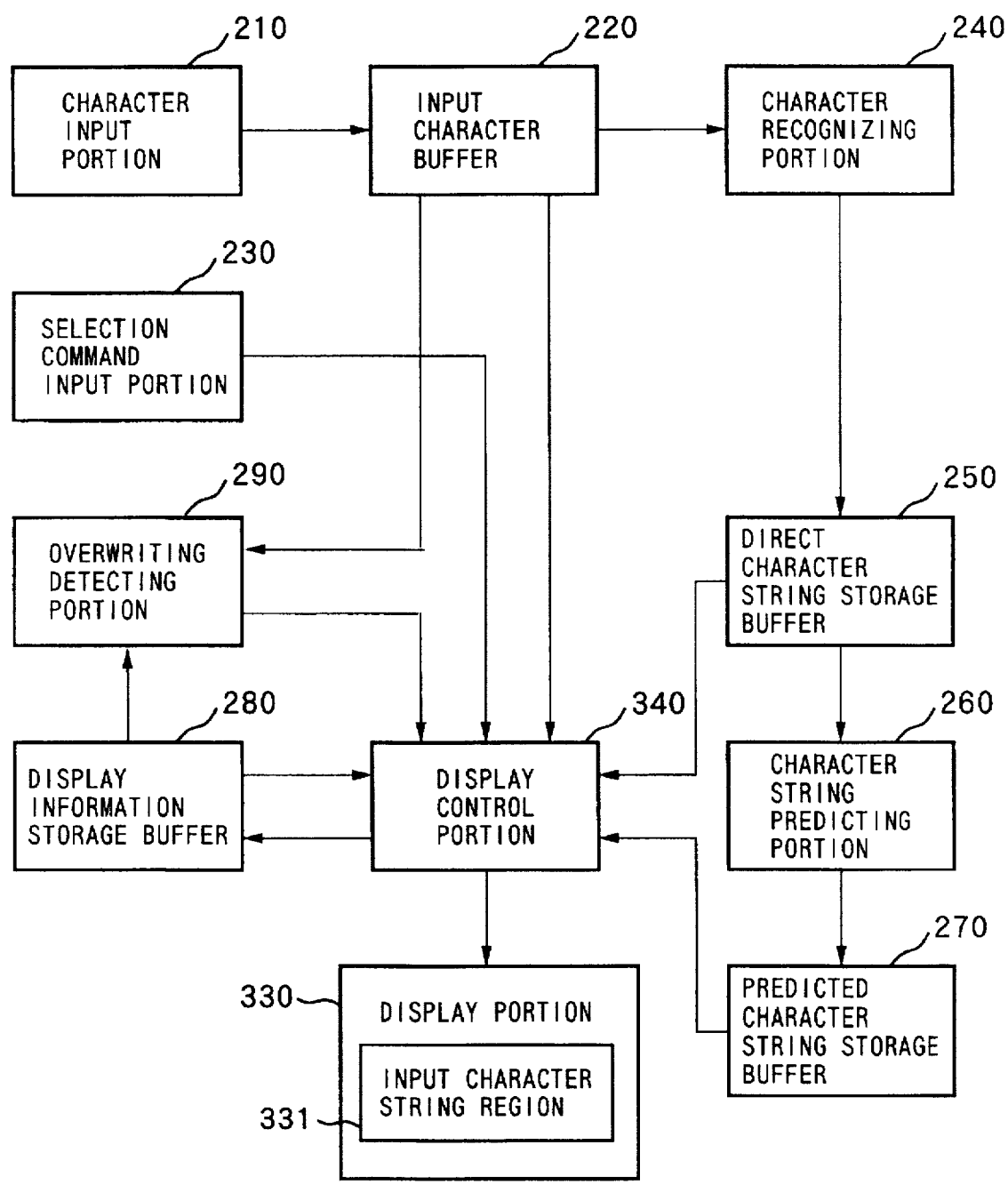
FIG. 28 is a block diagram of the sixth embodiment of a character string input device according to the present invention.

FIG. 28 is a block diagram showing the sixth embodiment of the character string input system according to the present invention.

As shown in FIG. 28, the illustrated embodiment of the character string input system comprises a character string input portion 210 for inputting a character string, an input character buffer 220 for temporarily storing the input character string, a selection command input portion 230 for inputting a command for selection and instruction, a character recognizing portion 240 for performing character recognition of the input character, a direct character string storage buffer 250 for storing a recognized character string, a character string predicting portion 260 for predicting a character string following the character string stored in the direct character string storage buffer 250, a predicted character string storage buffer 270 for storing predicted candidatures of character strings, a display information storage buffer 280 for displaying a character string, for which input character string processing is completed, an overwriting detecting portion 290 for detecting overwriting of the input character over the predicted character string, a display control portion 340 and a display portion 330.

Among the elements set forth above, the character input portion 210, the input character buffer 220, the selection command input portion 230, the character recognition portion 240, the direct character string storage buffer 250, the character string predicting portion 260, the predicted character string storage buffer 270 and display information storage buffer 280 are the same as those of the fourth embodiments, and the overwriting detecting portion 290 and the display portion 330 are the same as those in the foregoing fifth embodiment. The same reference numerals will be given for these elements and detailed discussion therefor is omitted to avoid redundancy.

The display control portion 340 is a means for forming the content of the display information storage buffer 280 on the basis of the contents of input character buffer 220, direct character string storage buffer 250, the predicted character string storage buffer 270 and overwriting detecting portion 290 controlling the display content of the display portion 330. To be concrete, the display control portion 340 performs controls through the following processes.

At first, the trace data in the input character buffer 220 is temporarily displayed in the input character string region 331 of the display portion 330. When the operation of the character recognizing portion 240 is completed, in place of the temporarily stored trace data, the character string corresponding to the content of the direct character string storage buffer 250 is re-displayed on the input character string region 331. On the other hand, in the display region for the predicted character string of the input character string region 331, one candidate character string in the predicted character string storage buffer 270 is displayed. When a selection command for the predicted character string is input from the selection command input portion 230, another predicted character string is displayed on the display region for the predicted character string in the input character string region 331. When the overwriting detection signal is received from the overwriting detecting portion 290, the characters in the predicted character string up to immediately preceding the overwritten character are fixed as the input character string. On the other hand, the characters in the predicted character string at and subsequent to the overwritten character are erased, namely, the process to be performed by the display control portion 340 in the illustrated embodiment is in addition to the display control for displaying another candidate character string in response to the selection command input against the currently displayed predicted character string, for the display control portion 320 in the fifth embodiment.

Figure 29:
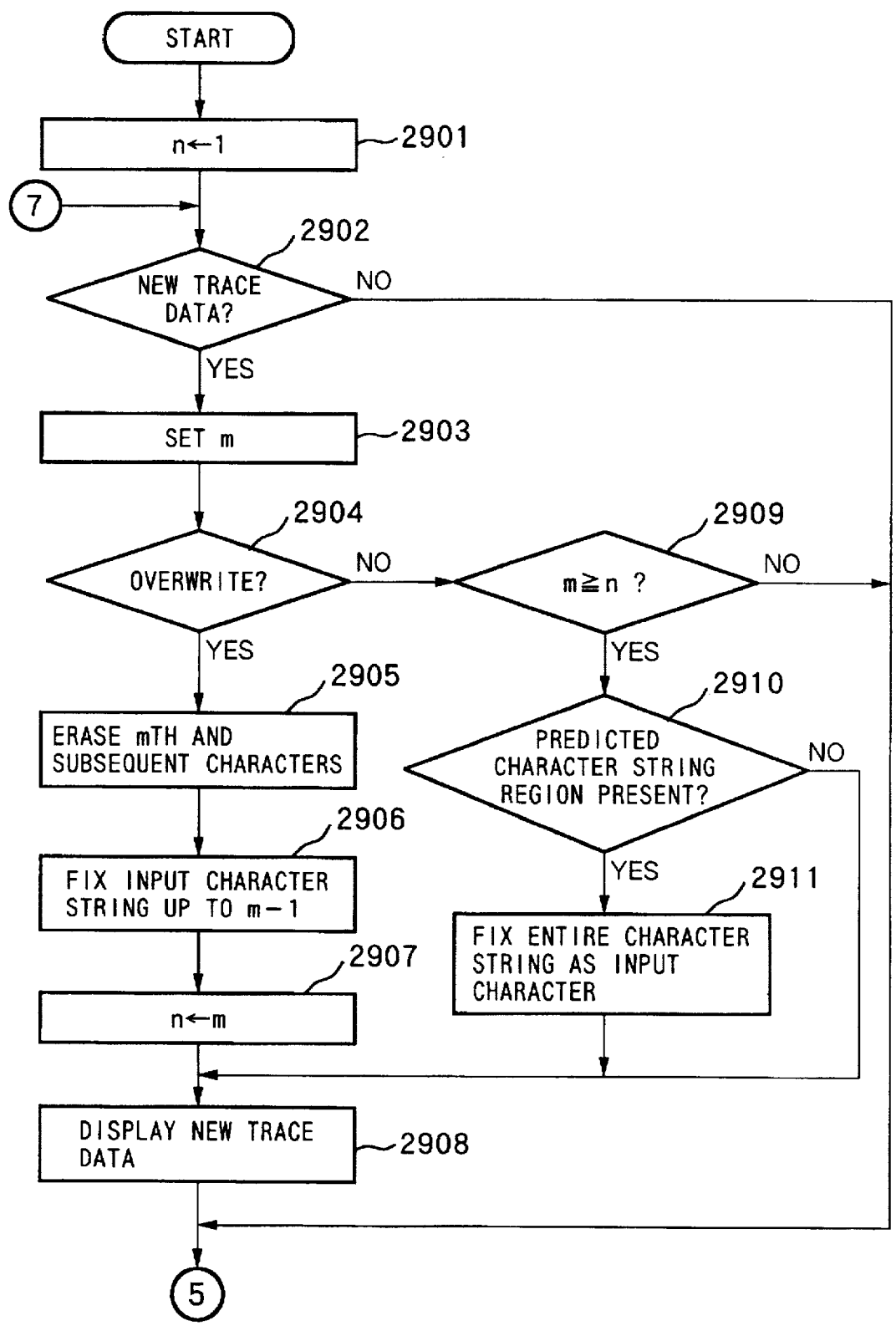
FIGS. 29 to 31 are a series of flowcharts showing an operation of the fifth embodiment of the character string input system.
Figure 30:
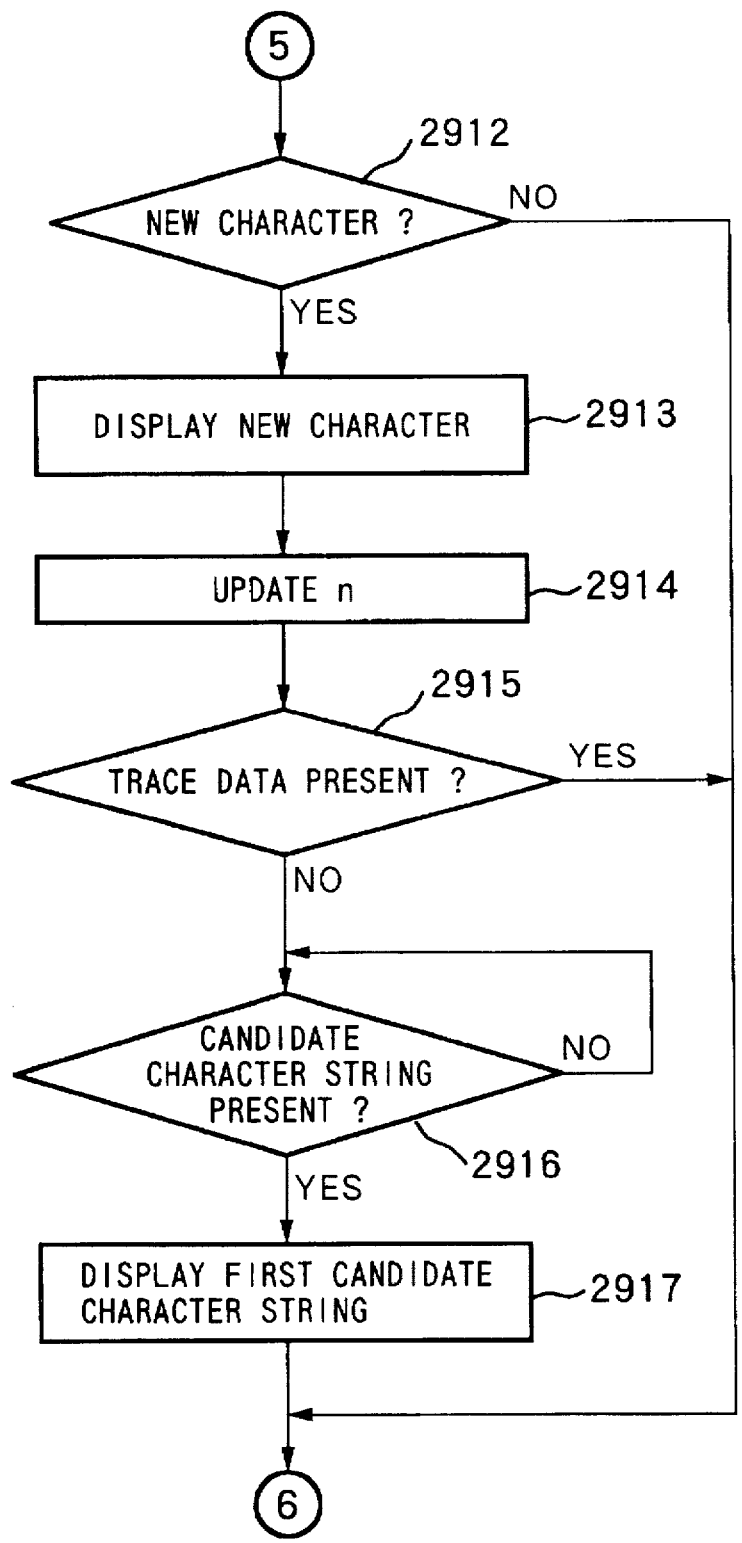
Figure 31:
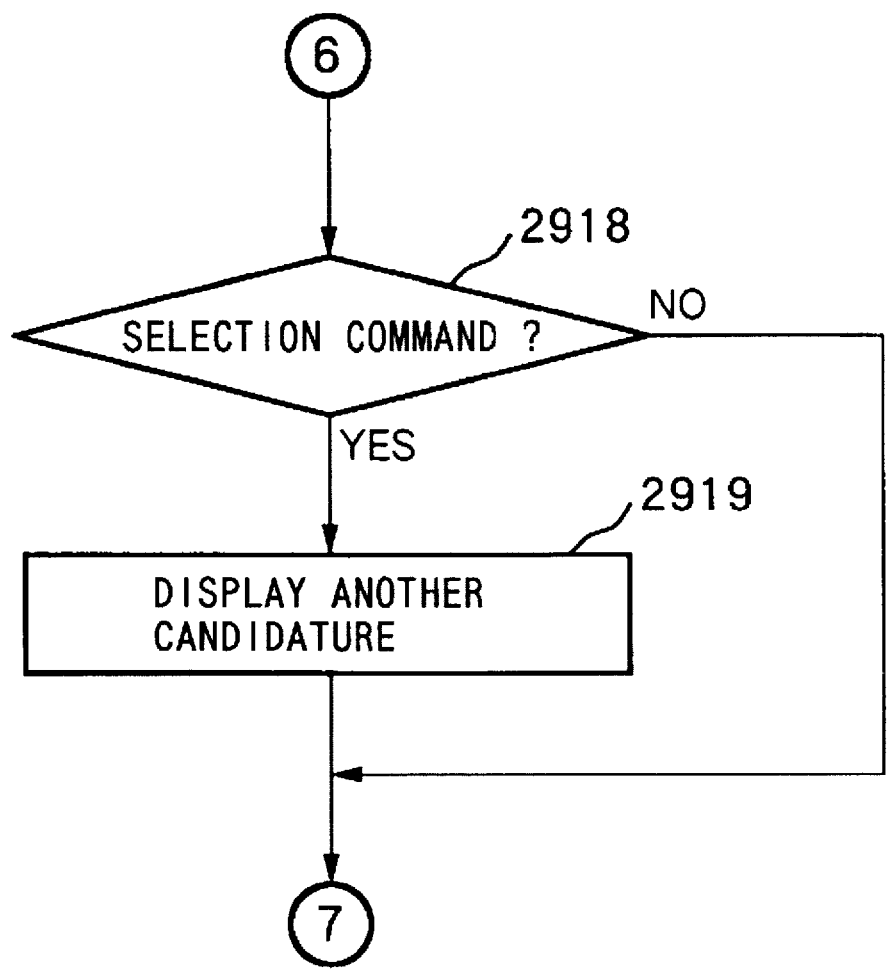

The operation of the display control portion 340 will be discussed with reference to the flowcharts of FIGS. 29, 30 and 31.

Figure 25:
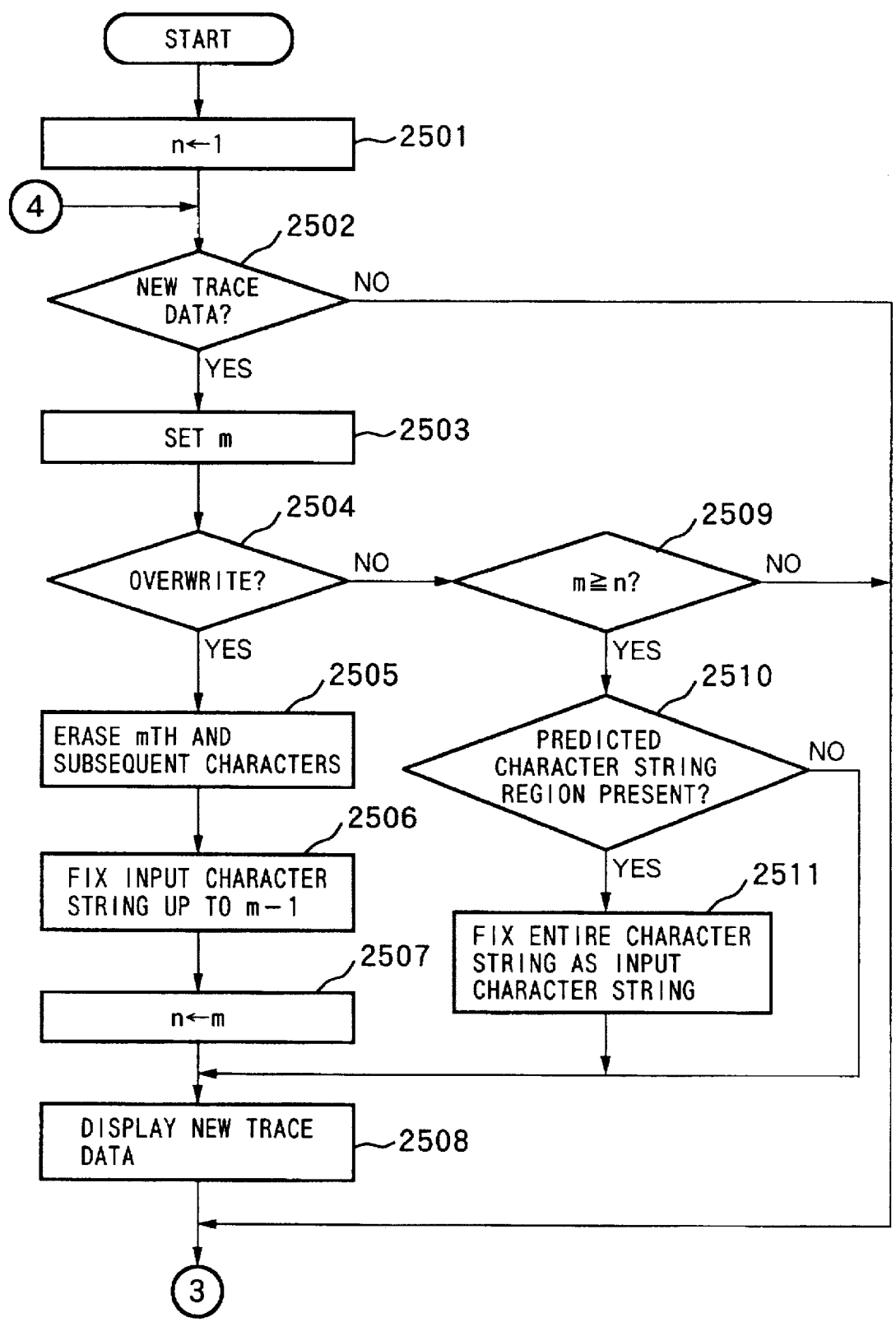
FIGS. 25 and 26 are a series of flowcharts showing an operation of the fifth embodiment of the character string input system.

It should be noted that the operation from setting the sign n at the initial value 1 and storing the new trace data in the input character buffer 220 to displaying of the predicted character string on the input character string region 331 of the display portion 330 (steps 2901 to 2917 of FIGS. 29 and 30) are the same as the operation in the fifth embodiment (steps 2501 to 2517 in the fifth embodiment of FIGS. 25 and 26).

The display control portion 340 in the illustrated embodiment is provided with a function for displaying another candidate character string when the first candidate character string is displayed (step 2917) and is the selection command for the predicted character string is input from the selection command input portion 230.

In this sixth embodiment, the input operation is performed by the display as shown in FIGS. 27A to 27F. Also, by employing a flowchart as illustrated in FIG. 31, the input operation with the display as illustrated in FIGS. 32A to 32E can be performed.

Figure 32A:
FIGS. 32A to 32E are illustrations showing a display in inputting character string.
Figure 32B:
Figure 32C:
Figure 32D:
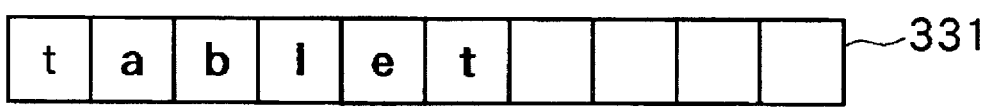
Figure 32E:
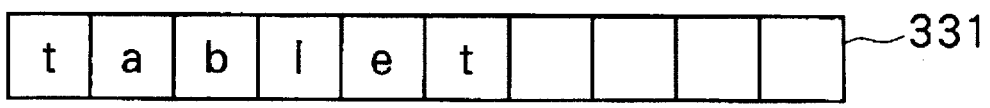

The state of the input character string region 331 as illustrated in FIG. 32A corresponds to the state of the input character string region 331 as shown in FIG. 27C. At this condition, when the selection command for selecting the candidate character string is input from the selection command input portion 230, another candidate character string is displayed on the display region for the predicted character string of the input character string region 331. Another predicted character string may be obtained from the predicted character string storage buffer 270. In the example of the display in FIGS. 32A to 32E, the order of the candidate character strings is adapted to the order of the words in the word dictionary 400 of FIG. 6. The candidate character string is varied from "ake" to "alk". Then, at every occurrence of the candidate character string, the content of the display in the input character string region 331 (candidate character string) is varied. At the stage of FIG. 32D, the desired predicted character string has been attained.

It should be noted, upon providing the selection command of the candidate character string, it may be possible to designate the predicted character string together with the position thereof. For instance, with respect to the direct character string "t", consideration is given that the candidate character string is "ake". At this time, in the discussion for the former embodiment, as the candidate character strings, all of the words having "t" as the leading character in the word dictionary 400 of FIG. 6, may correspond. With respect to this, by selection command for the predicted character string, the position in the character string "b" in the character string region is given. Then it is possible to perform display control for the candidate character string by fixing the portion preceding the position of the character "b". In such case, in terms of the word dictionary 400 of FIG. 6, only words beginning from "ta" can be the candidate character string.

On the other hand, from the selection command input portion 230, not only the selection command for the predicted character string, but also the selection command for the input character string may be input. In such a case, for the selection command of the input character string region, another candidate character generated by the character recognition portion 240 may be displayed. It may be possible to obtain another candidate character in the character recognition portion 240, from the direct character string storage buffer 250.

Figure 33:
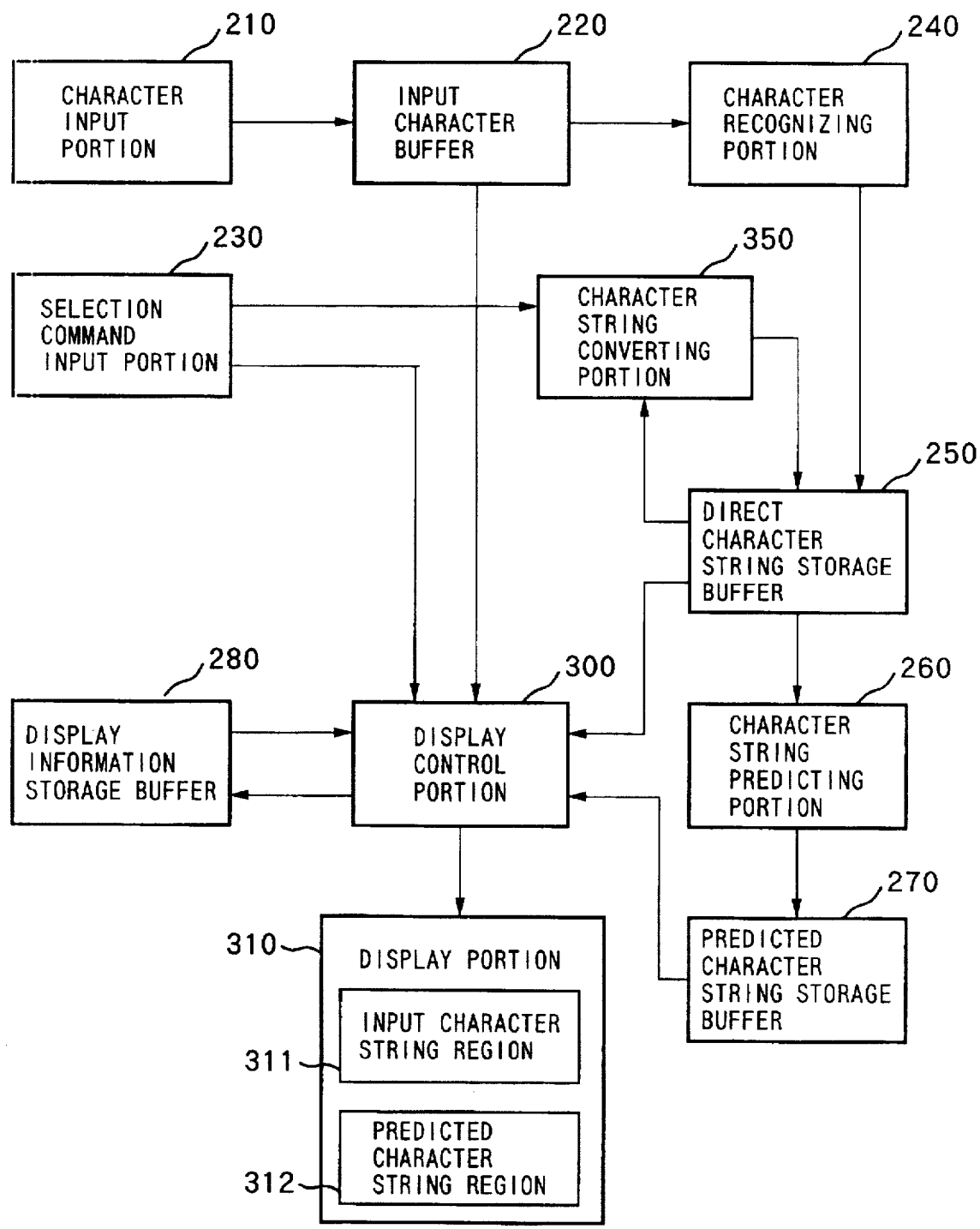
FIG. 33 is a block diagram of the seventh embodiment of a character string input device according to the present invention.
Figure 34:
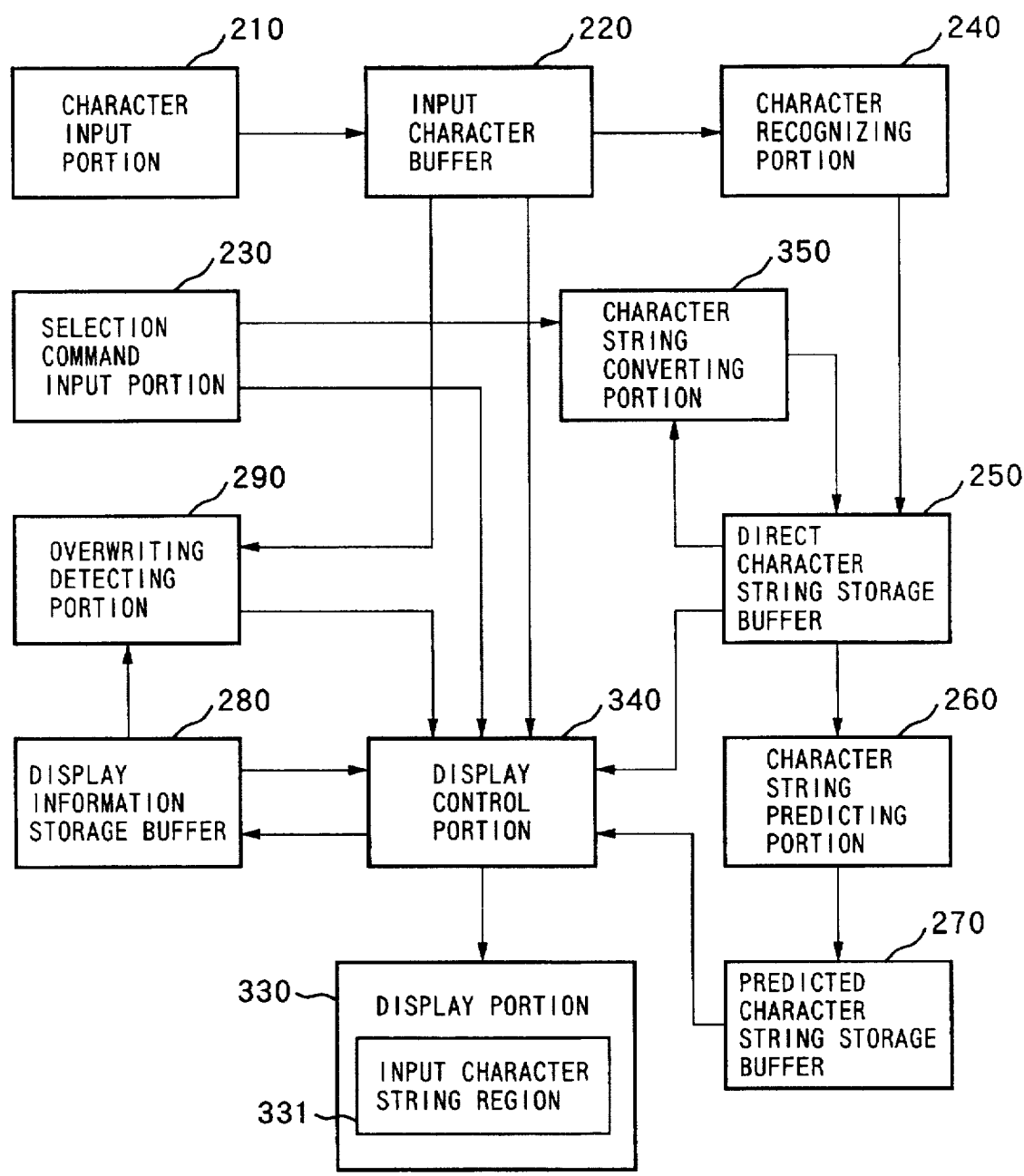
FIG. 34 is a block diagram of the eighth embodiment of a character string input device according to the present invention.

FIG. 33 is a block diagram showing the seventh embodiment of the character string input system according to the invention, and FIG. 34 illustrates the eighth embodiment of the character string input system according to the invention. The seventh embodiment includes a character string converting portion 350 in addition to the construction in the fifth embodiment. Similarly, the eighth embodiment is constructed by including the character string converting portion 350 in addition to the construction of the sixth embodiment.

The character string converting portion 350 converts the expression of the input character string. In response to the selection command from the selection command input portion 230, the character string converting portion 350 re-writes the expression of the character string in the direct character string storage buffer 250. Accordingly, on the basis of the character string obtained from the character recognition portion 240, it becomes possible to perform processing by the character string predicting portion 260 not only for the character string but also to once modify the expression of the character string obtained from the character recognition portion 240 and then for processing by the character string predicting portion 260.

In the foregoing embodiment, as a method for realizing the character string predicting portion 260, a method to make reference to the word dictionary for retrieving partially matching character strings, such method only permits prediction for the trailing part of the character string. However, the character string predicting portion 260 may be realized by various methods.

For example, instead of employing the word dictionary, prediction of the character string may be performed by utilizing likelihood of connection in character to character basis. It may be possible to check a frequency of occurrence of certain combinations of the characters by investigating large amounts of phrases. On the basis of the results of investigation, a list is made of the characters having a high likelihood to appear following a certain character. On the basis of the likelihood of connection for the certain character, the order of the character having high frequency of appearance following the certain character can be derived to generate the predicted character string.

On the other hand, there is a method to use a simultaneously appearing likelihood of the words. Also, the likelihood of simultaneous occurrence may be sorted by possibility of simultaneous occurrence or by similarity of the meaning.

Also, it is possible to make the character strings to be easily connected in view of a part of speech as the predicted character strings. For instance, a suffix, such as "er", "ing", "ed" immediately after verb is easily connected, and these character strings may be the predicted character string. In such a case, according to the rules of grammar, some of the suffixes may be avoided from the predicted character strings. A part of speech which can immediately follow a certain part of speech can be obtained by utilizing a connection table to be used for the conventionally known morphological analyzer. Furthermore, prediction based on sentence pattern, grammatical construction pattern and so forth can also be possible.

Figure 22:
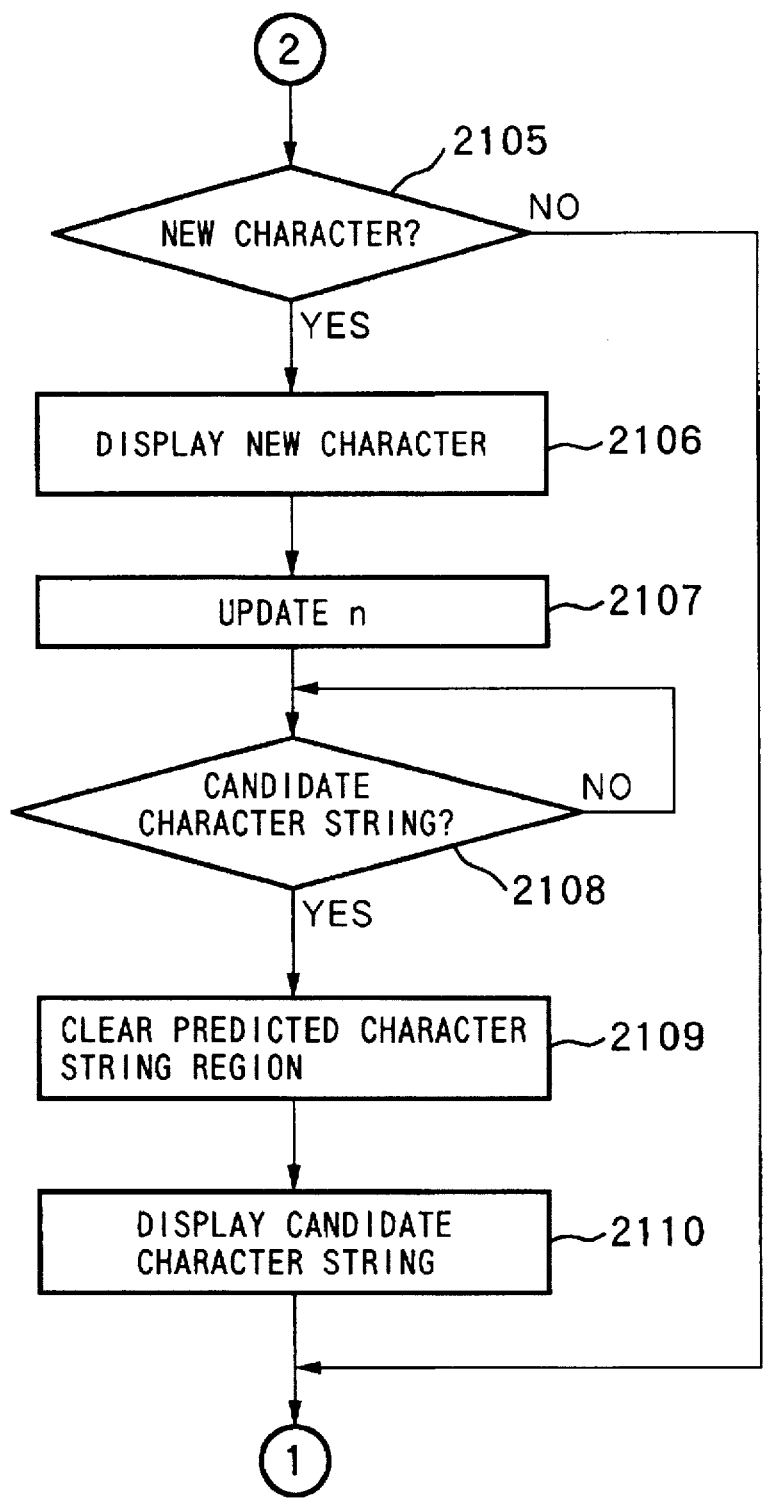

It should be noted that, in the operation of the display control portion in the process of the step 2108 of FIG. 22 or the step 2516 of FIG. 26, it is possible to form a infinite loop when the character string predicting portion 260 cannot generate any candidate character string. This possibility may be avoided by providing a function to set a dummy candidate character string in the predicted character string storage buffer 270 when the character string predicting portion 260 cannot generate any candidate character sting, for example. Also, the process in the step 2108 or the step 2516 may be modified to branch depending upon presence and absence of the candidate character string. The flowcharts illustrated in FIGS. 21, 22, 25, 26, 29 and 30 should be understood as mere examples and the present invention should not be understood to be limited to the shown processes.

As set forth above, according to the illustrated embodiments, for the character string input system, particularly of the type, in which the character is input by character recognition of the handwritten character, input speed and input efficiency of the character string can be remarkably improved.

Also, according to the present invention, the number of characters to be handwritten can be significantly reduced. This contributes to reduction of a possibility of erroneous recognition of the character in the character recognition. Therefore, reduction of a number of handwritten characters is significantly advantageous in view of efficiency of input.

Also, since the omitted portion can be supplemented without requiring a positive indication of the portion of the character string where one or more characters are omitted, input efficiency can be further improved.

Also, in the illustrated embodiment, when the predicted character string does not match the desired character string to be input, the portion partially matching may be used as input characters. Furthermore, in the illustrated embodiment, since the subsequent part of the character string can be automatically erased upon occurrence of overwriting, erasure of the unnecessary character on a one by one basis can be avoided.

While the present invention has been discussed in terms of the character string input system, in which inputting of a character string is performed by character recognition for the handwritten character string, the present invention may be applicable for the character input system utilizing the keyboard and so forth in inputting a large amount of character strings.

Although the invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiments set out above but to include all possible embodiments which can be embodied within a scope encompassed and equivalents thereof with respect to the features set out in the appended claims.

What is claimed is:

1. A character string input system comprising:

input storage means for temporarily storing an input character string having an incomplete input indicative sign;

a word dictionary having a plurality of stored words;

incomplete word supplementing means for comparing the character string having the incomplete input indicative sign with the stored words in the word dictionary and for selecting characters in the words corresponding to the incomplete input indicative sign as a candidate character string;

neglected word supplementing means for predicting at least one word to be supplemented corresponding to the position of the incomplete input indicative sign indicating omission of a word as the candidate character string;

supplementing candidature storage means for temporarily storing as a candidature at least one candidate character string of the incomplete word supplementing means and the neglected word supplementing means; and supplementing control means for controlling said incomplete word supplementing means when the incomplete input indicative sign indicates an incomplete word; for controlling said neglected word supplementing means when the incomplete input indicative sign indicates omission of a word; and for retrieving the candidature corresponding to the position of the incomplete input indicative sign in the character string having the incomplete input indicative sign.

2. A character string input system as set forth in claim 1, which further comprises:

character string input means for inputting the character string;

incomplete input indicative sign input means for inputting the incomplete input indicative sign indicative of omission of a word;

example storage means for storing examples of words; and selection command input means for inputting a command for selection of one of the candidate character strings from the candidature.

3. A character string input system as set forth in claim 2, wherein said input storage means temporarily stores the input character string having the incomplete input indicative sign input by said character string input means and said incomplete input indicative sign input means;

said incomplete word supplementing means compares said input character string having said incomplete input indicative sign with said word dictionary by regarding the incomplete input indicative sign as indicating omission of a part of word as a wild card;

said neglected word supplementing means predicts the at least one word to be supplemented at the position of the incomplete input indicative sign indicating omission of a word based on the examples of the words stored in said example storage means; and said supplementing control means, when a plurality of candidate character strings are present, controls said selection command input means to select one of the candidate character strings.

4. A character string input system as set forth in claim 1, which further comprises:

character string input means for inputting the character string;

incomplete input indicative sign input means for inputting the incomplete input indicative sign indicative of omission of a character string;

example storage means for storing examples of words; and selection command input means for inputting a command for selection of one of the one of the candidate character strings from the candidature.

5. A character string input system as set forth in claim 4, wherein said input storage means temporarily stores the input character string having the incomplete input indicative sign input by said character string input means and said incomplete input indicative sign input means;

said incomplete word supplementing means compares said input character string having said incomplete input indicative sign with said word dictionary by regarding the incomplete input indicative sign as a wild card;

said neglected word supplementing means predicts the at least one word to be supplemented corresponding to the position of the incomplete input indicative sign in the character string having the incomplete input indicative sign based on the examples of the words in said example storage means; and said supplementing control means controls said incomplete word supplementing means and said neglected word supplementing means on the basis of a kind of the incomplete input indicative sign in the input storage means and the command input by said selection command input means to determine the character string corresponding to the position of said incomplete input indicative sign in the character string having the incomplete input indicative sign.

6. A character string input system as set forth in claim 5, wherein said supplementing control means controls said incomplete word supplementing means on the basis of the kind of the incomplete input indicative sign in said input storage means, and when the candidature is not obtained or when control of said neglected word supplementing means is commanded by said selection command input means, said supplementing control means controls said neglected word supplementing means to determine the character string corresponding to the position of the incomplete input indicative sign in said character string having the incomplete input indicative sign.

7. A character string input system comprising:

character handwriting means for obtaining a handwritten character trace data;

handwritten character storage means for storing the trace data;

character recognizing means for performing character recognition of the trace data and for deriving a character code;

direct character string storage means for storing the character string character derived by said character recognizing means;

character string predicting means for generating a candidate character string directly following said character string in said direct character string storage means after completion of recognition by said character recognizing means;

predicted character string storage means for storing the candidate character string generated by said character string predicting means;

display means for displaying a predicted character string region immediately following an input character string region;

display information storage portion for storing information to be displayed on said display means;

overwriting detecting means for detecting overwriting of the handwritten character on the predicted character region; and display control means for constructing a content of said display information storage means on the basis of the content of the handwritten character storage means, the content of said direct character string storage means, the content of said predicted character string storage means and an overwriting detection signal from said overwriting detecting means, and controlling the content of display of said display means.

8. A character string input system as set forth in claim 7, wherein said display control means temporarily displays the trace data in said handwritten character storage means on said input character region;

updates the display in said input character region with a character string corresponding to said direct character string storage means, in place of said trace data, when character recognition for said trace data by said character recognizing means is completed;

displays one candidate character string in said predicted character string storage means in said predicted character string region; and when said overwriting detection signal is received from said overwriting detecting means, fixes the character in said predicted character string up to one immediately preceding the overwriting character as the input character string and erases the characters in said predetermined character string at and subsequent to the overwritten character.

9. A character string input system comprising:

character input means for obtaining an handwritten character trace data;

input character storage means for storing the trace data;

selection command input means for an inputting command for selection and verification;

character recognizing means for performing character recognition of the trace data and for deriving a character code;

direct character string storage means for storing the character string character coded by said character recognizing means;

character string predicting means for generating a candidate character string directly following said character string in said direct character string storage means after completion of recognition by said character recognizing means;

predicted character string storage means for storing the candidate character string generated by said character string predicting means;

display means for displaying a predicted character string region immediately following an input character string region;

display information storage portion for storing information to be displayed on said display means;

overwriting detecting means for detecting overwriting of the handwritten character on the predicted character region; and display control means for constructing a content of said display information storage means on the basis of the content of the handwritten character storage means, the content of said direct character string storage means, the content of said predicted character string storage means, an overwriting detection signal from said overwriting detecting means and the command from said selection command input means, and controlling the content of display of said display means.

10. A character string input system as set forth in claim 9, wherein said display control means temporarily displays the trace data in said handwritten character storage means on said input character region;

updates the display in said input character region with a character string corresponding to said direct character string storage means in place of said trace data when character recognition for said trace data by said character recognizing means is completed;

displays one character string in said predicted character string storage means in said predicted character string region;

displays another candidate character string stored in said predicted character string storage means in said predicted character string region in response to the selection command from said selection command input means; and when said overwriting detection signal is received from said overwriting detecting means, fixes the character in said predicted character string up to one immediately preceding the overwriting character as the input character string and erases the characters in said predetermined character string at and subsequent to the overwritten character.

* * * * *